US009041774B2

(12) United States Patent
Genova et al.

(10) Patent No.: US 9,041,774 B2
(45) Date of Patent: May 26, 2015

(54) DYNAMIC ADJUSTMENT OF PREDETERMINED THREE-DIMENSIONAL VIDEO SETTINGS BASED ON SCENE CONTENT

(75) Inventors: Barry M Genova, Kenmore, WA (US); Michael Gutmann, Duvall, WA (US)

(73) Assignee: Sony Computer Entertainment America, LLC, San Mateo, CA (US)

( * ) Notice: Subject to any disclaimer, the term of this patent is extended or adjusted under 35 U.S.C. 154(b) by 424 days.

(21) Appl. No.: 12/986,814

(22) Filed: Jan. 7, 2011

(65) Prior Publication Data
US 2012/0176473 A1 Jul. 12, 2012

(51) Int. Cl.
H04N 13/02 (2006.01)
H04N 13/00 (2006.01)

(52) U.S. Cl.
CPC ....... *H04N 13/0022* (2013.01); *H04N 13/0011* (2013.01); *H04N 13/0278* (2013.01); *H04N 13/0296* (2013.01)

(58) Field of Classification Search
None
See application file for complete search history.

(56) References Cited

U.S. PATENT DOCUMENTS

| 6,031,538 | A | 2/2000 | Chupeau et al. |
| 7,038,707 | B2 | 5/2006 | Shimizu |
| 8,106,924 | B2 | 1/2012 | Aliprandi et al. |
| 8,289,346 | B2 | 10/2012 | Priede et al. |
| 8,514,225 | B2 | 8/2013 | Genova |
| 2001/0053247 | A1 | 12/2001 | Sowinski et al. |
| 2002/0080143 | A1* | 6/2002 | Morgan et al. ................. 345/581 |
| 2005/0089212 | A1 | 4/2005 | Mashitani et al. |
| 2005/0190180 | A1* | 9/2005 | Jin et al. ......................... 345/419 |
| 2005/0226538 | A1 | 10/2005 | Di Federico et al. |
| 2006/0078180 | A1 | 4/2006 | Berretty et al. |
| 2006/0088206 | A1* | 4/2006 | Era ................................. 382/154 |
| 2006/0232584 | A1 | 10/2006 | Utsugi et al. |
| 2007/0146360 | A1 | 6/2007 | Clatworthy et al. |
| 2008/0043096 | A1 | 2/2008 | Vetro et al. |
| 2008/0085040 | A1 | 4/2008 | Basu et al. |
| 2008/0174659 | A1 | 7/2008 | McDowall |
| 2009/0147074 | A1 | 6/2009 | Getty |
| 2009/0168187 | A1 | 7/2009 | Woodgate et al. |
| 2009/0244268 | A1 | 10/2009 | Masuda et al. |
| 2009/0315996 | A1 | 12/2009 | Guler et al. |
| 2010/0073368 | A1 | 3/2010 | Kim et al. |

(Continued)

FOREIGN PATENT DOCUMENTS

WO 2009027691 A1 3/2009

OTHER PUBLICATIONS

PCT International Search Report mailed date Apr. 9, 2012 for PCT Application No. PCT/US11/62998.

(Continued)

*Primary Examiner* — Chikaodili E Anyikire
(74) *Attorney, Agent, or Firm* — Joshua D. Isenberg; JDI Patent

(57) ABSTRACT

Predetermined three-dimensional video parameter settings may be dynamically adjusted based on scene content. One or more three-dimensional characteristics associated with a given scene may be determined. One or more scale factors may be determined from the three-dimensional characteristics. The predetermined three-dimensional video parameter settings can be adjusted by applying the scale factors to the predetermined three-dimensional video parameter settings. The scene may be displayed on a three-dimensional display using the resulting adjusted set of predetermined three-dimensional video parameters.

24 Claims, 11 Drawing Sheets

(56) References Cited

U.S. PATENT DOCUMENTS

| | | |
|---|---|---|
| 2010/0142924 A1* | 6/2010 | Yamashita et al. .............. 386/95 |
| 2010/0215251 A1 | 8/2010 | Klein Gunnewiek et al. |
| 2010/0238164 A1 | 9/2010 | Steedly et al. |
| 2010/0295853 A1 | 11/2010 | Diamand |
| 2010/0315412 A1 | 12/2010 | Sinha et al. |

OTHER PUBLICATIONS

Christopher Fehn, "A 3D-TV Approach Using Depth-Image-Based Rendering (DIBR)", Proceedings of Visualization, Imaging, and Image Processing (VIIP), Sep. 8-10, 2003, track 396-084.

Voicu Popescu, "Forward Rasterization: A Reconstruction Algorithm for Image-Based Rendering", Doctoral Thesis, Department of Department of Computer Science University of North Carolina, Chapel Hill, May 2001.

Voicu Popescu et al. "High Quality 3D Image Warping by Separating Visibility from Reconstruction", 1999.

U.S. Appl. No. 12/986,827, to Barry M. Genova, entitled "Scaling Pixel Depth Values of User-Controlled Virtual Object in Threedimensional Scene", filed Jan. 7, 2011.

U.S. Appl. No. 12/986,854, to Barry Genova and Tobias Berghoff, entitled "Morphological Anti-Aliasing (MLAA) of a Re-Projection of a Two-Dimensional Image", filed Jan. 7, 2011.

U.S. Appl. No. 12/986,872, to Barry M. Genova, entitled "Multi-Sample Resolving of Re-Projection of Two-Dimensional Image", filed Jan. 7, 2011.

Final Office Action of May 3, 2013 for U.S. Appl. No. 12/986,872, filed Jan. 7, 2011.

Office Action of May 7, 2013 for U.S. Appl. No. 12/986,854, filed Jan. 7, 2011.

Office Action of Nov. 8, 2012 for U.S. Appl. No. 12/986,872, filed Jan. 7, 2011.

Office Action of Oct. 26, 2012 for U.S. Appl. No. 12/986,827, filed Jan. 7, 2011.

Final Office Action for U.S. Appl. No. 12/986,872, dated May 29, 2014.

Non-Final Office Action for U.S. Appl. No. 14/038,616, dated May 16, 2014.

De Man, Bruno, and Samit Basu. "Distance-driven projection and backprojection in three dimensions." Physics in medicine and biology 49.11 (2004): 2463.

Non-final Office Action dated Sep. 30, 2013 for U.S. Appl. No. 12/986,872, filed Jan. 7, 2011.

Notice of Allowance for U.S. Appl. No. 12/986,854 dated Aug. 23, 2013.

Reshetov, Alexander Intel Labs. "Morphological antialiasing." Proceedings of the Conference on High Performance Graphics 2009. pp. 109-116. ACM New York, NY, USA © 2009.

U.S. Appl. No. 14/038,616, to Barry M. Genova, filed Sep. 26, 2013.

Non-Final Office Action for U.S. Appl. No. 14/038,616, dated Nov. 19, 2014.

Fehn "Depth-image-based rendering (DIBR), compression, and transmission for a new approach on 3D-TV." Electronic Imaging 2004. International Society for Optics and Photonics, 2004.

Non-Final Office Action for U.S. Appl. No. 12/986,872, dated Oct. 8, 2014.

Po, Lai-Man, et al. "Automatic 2D-to-3D video conversion technique based on depth-from-motion and color segmentation." Signal Processing (ICSP), 2010 IEEE 10th International Conference on. IEEE, 2010.

Final Office Action for U.S. Appl. No. 12/986,872, dated Feb. 25, 2015.

Final Office Action for U.S. Appl. No. 14/038,616, dated Mar. 20, 2015.

U.S. Appl. No. 14/671,953 to Inventors Barry M. Genova and Michael Gutmann, filed Mar. 27, 2015.

* cited by examiner

DYNAMIC ADJUSTMENT OF PREDETERMINED THREE-DIMENSIONAL VIDEO SETTINGS BASED ON SCENE CONTENT

CROSS REFERENCE TO RELATED APPLICATIONS

This application is related to commonly-assigned co-pending application Ser. No. 12/986,827, entitled "SCALING PIXEL DEPTH VALUES OF USER-CONTROLLED VIRTUAL OBJECT IN THREE-DIMENSIONAL SCENE", filed the same date as the present application.

This application is related to commonly-assigned co-pending application Ser. No. 12/986,854, entitled "MORPHOLOGICAL ANTI-ALIASING (MLAA) OF A RE-PROJECTION OF A TWO-DIMENSIONAL IMAGE", filed the same date as the present application.

This application is related to commonly-assigned co-pending application Ser. No. 12/986,872, entitled "MULTI-SAMPLE RESOLVING OF RE-PROJECTION OF TWO-DIMENSIONAL IMAGE", filed the same date as the present application.

FIELD OF INVENTION

Embodiments of the present invention are related to a dynamic adjustment of user-determined three-dimensional scene settings.

BACKGROUND OF INVENTION

The ability to perceive two-dimensional images in three-dimensions by way of numerous different technologies has grown quite popular over the past few years. Providing an aspect of depth to two-dimensional images potentially creates a greater sense of realism to any depicted scene. This introduction of three-dimensional visual representation has greatly enhanced viewer experiences, especially in the realm of video games.

A number of techniques exist for the three-dimensional rendering of a given image. Most recently, a technique for projecting a two-dimensional image(s) into three-dimensional space known as depth-image-based rendering (DIBR) has been proposed. In contrast to former proposals, which often relied on the basic concept of "stereoscopic" video, i.e., the capturing, transmission, and display of two separate video streams—one for the left eye and one for the right eye—, this new idea is based on a more flexible joint transmission of monoscopic video (i.e., single video stream) and associated per-pixel depth information. From this data representation, one or more "virtual" views of the 3-D scene can then be generated in real-time at the receiver side by means of so-called DIBR techniques. This new approach to three-dimensional image rendering presents several advantages over previous approaches.

First, this approach allows 3-D projection or display to be adjusted to fit a wide range of different stereoscopic displays and projection systems. Because the required left—and right-eye views are only generated at the 3D-TV receiver, their appearance in terms of 'perceived depth' can be adapted to the particular viewing conditions. This provides the viewer with a customized 3-D experience that is comfortable to watch on any kind of stereoscopic or autostereoscopic 3D-TV display.

DIBR also allows for 2D-to-3D conversion based on "structure from motion" approaches that can be used to generate the required depth information for already recorded monoscopic video material. Thus, 3D video can be generated from 2D video for a wide range of programming, which could play a significant role in the success of 3D-TV.

Head motion parallax (i.e., apparent displacement or difference in the perceived position of an object caused by change in viewing angle) can be supported under DIBR to provide an additional extrastereoscopic depth cue. This eliminates the well-known "shear-distortions" (i.e., stereoscopic image appears to follow the observer when the observer changes viewing position) that are usually experienced with stereoscopic- or autostereoscopic 3D-TV systems.

Furthermore, photometrical asymmetries, e.g., in terms of brightness, contrast or color, between the left- and the right-eye view, which can destroy the stereoscopic sensation, are eliminated from the first, as both views are effectively synthesized from the same original image. Also, it enables automatic object segmentation based on depth-keying and allows for an easy integration of synthetic 3D objects into "real-world" sequences.

Lastly, this approach allows the viewer to adjust the reproduction of depth to suit his/her personal preferences—much like every conventional 2D-TV set allows the viewer to adjust the color reproduction by means of a (de-)saturation control. This is a very important feature because there is a difference in depth appreciation over age groups. A recent study by Norman et al., for example, demonstrated that older adults were less sensitive than younger adults to perceiving stereoscopic depth.

While each viewer may have a unique set of preferred depth settings, so too does each scene presented to the viewer. The content of each scene dictates what range of depth settings should be used for optimal viewing of the scene. One set of re-projection parameters may not be ideal for every scene. For example, different parameters may work better depending how much of the distant background is in the field of view. Because the content of a scene changes each time a scene changes, existing 3D systems do not take the content of a scene when determining re-projection parameters.

It is within this context that the embodiments of the present invention arise.

DESCRIPTION OF THE SPECIFIC EMBODIMENTS

For any viewer of a projected three-dimensional image, several characteristics/cues govern their perception of depth. Each viewer's ability to perceive depth in a three-dimensional projection is unique to their own pair of eyes. Certain cues can provide certain depth characteristics associated with a given scene to a viewer. By way of example, and not by way of limitation, these binocular cues may include stereopsis, convergence, and shadow stereopsis.

Stereopsis refers to a viewer's ability to judge depth by processing information derived from the different projection of objects onto each retina. By using two images of the same scene obtained from slightly different angles, it is possible to triangulate the distance to an object with a high degree of accuracy. If an object is far away, the disparity of that image falling on both retinas will be small. If the object is close or near, the disparity will be large. By adjusting the angular difference between the different projections of the same scene, a viewer may be able to optimize his perception of depth.

Convergence is another binocular cue for depth perception. When two eye balls focus on the same object, they converge. This convergence will stretch extraocular muscles. It is the kinestethic sensations of these extraocular muscles that aid in the perception of depth. The angle of convergence is smaller when the eye is fixating on far away objects, and greater when focusing on nearer objects. By adjusting the convergence of the eyes for a given scene, a viewer may be able to optimize his perception of depth.

Shadow stereopsis refers to the stereoscopic fusing of shadows to impart depth on a given scene. Amplifying or diminishing the intensity of a scene's shadows may further optimize a viewer's perception of depth.

By adjusting scene settings associated with these binocular cues, a viewer may optimize his general three-dimensional perception of depth. While a given user may be able to select a general set of three-dimensional scene settings for viewing of all scenes, each scene is unique and as such certain visual cues/user settings may need to be dynamically adjusted depending on the contents of that particular scene. For example, in the context of a virtual world, it may be important for a viewer to focus on a particular object in a given scene. However, the viewer's pre-determined three-dimensional scene settings may not be the most favorable for viewing that particular object. Here, the viewer's settings would be dynamically adjusted according to the scene such that the particular object is perceived under a more optimal set of three-dimensional scene settings.

Figure 1A:
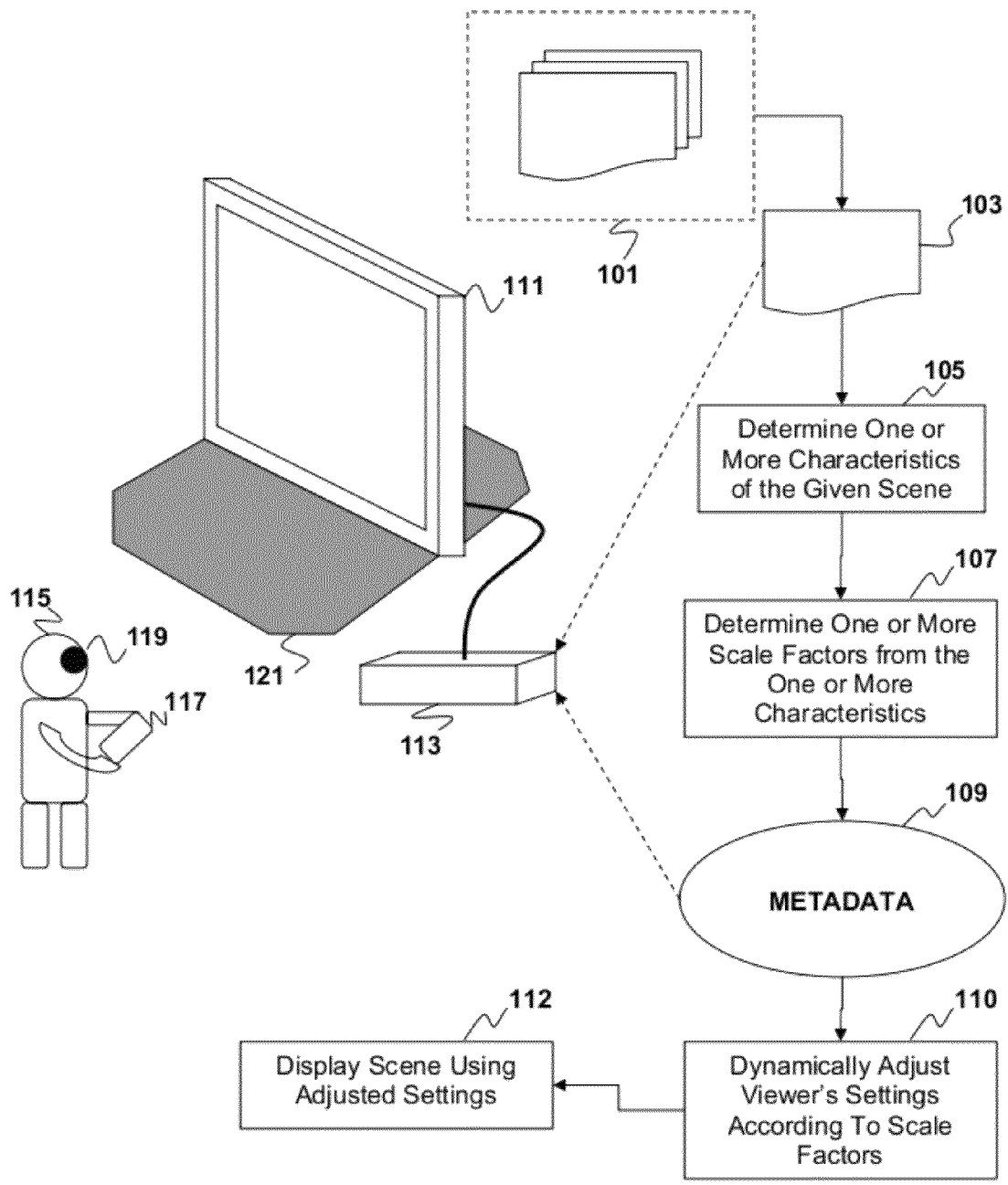
FIG. 1A is a flow/schematic diagram illustrating a method for dynamic adjustment of user-determined three-dimensional scene settings according to an embodiment of the present invention.
Figure 7:
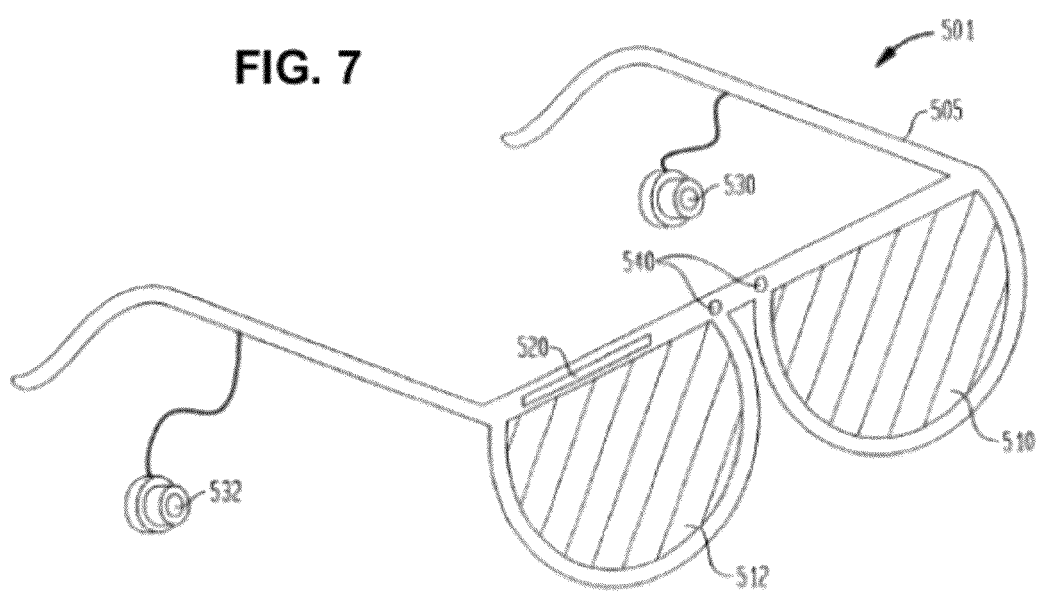
FIG. 7 is an isometric view of three-dimensional viewing glasses in accordance with an aspect of the invention.
Figure 8:
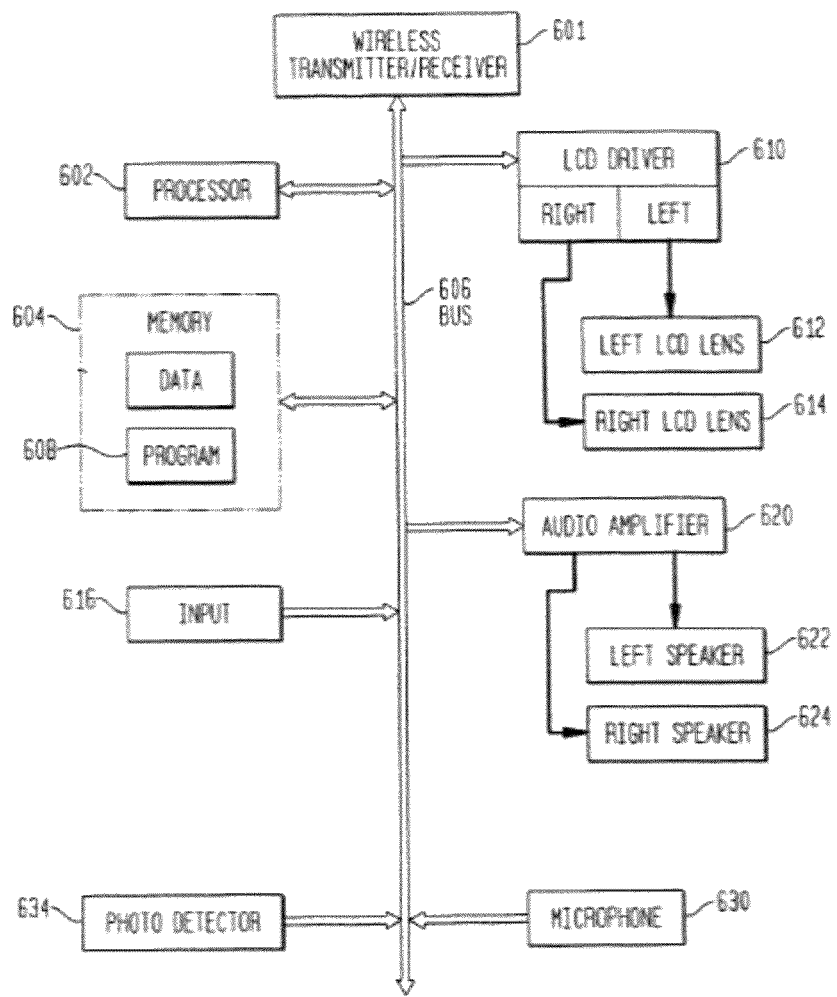
FIG. 8 is a system level block diagram of three-dimensional viewing glasses in accordance with an aspect of the invention.

FIG. 1A is a flow diagram illustrating a method for dynamic adjustment of user-determined three-dimensional scene settings according to an embodiment of the present invention. Initially, a viewer 115 communicates with a processor 113 configured to stream three-dimensional video data to a visual display 111. The processor 113 may be in the form of a video game console, computer apparatus, or any other device capable of processing three-dimensional video data. By way of example, and not by way of limitation, the visual display 111 may be in the form of a 3-D ready television set that displays text, numerals, graphical symbols or other visual objects as stereoscopic images to be perceived with a pair of 3-D viewing glasses 119. An example of 3-D viewing glasses is depicted in FIGS. 7-8 and described in detail below. The 3-D viewing glasses 119 may be in the form of active liquid crystal shutter glasses, active "red eye" shutter glasses, passive linearly polarized glasses, passive circularly polarized glasses, interference filter glasses, complementary color anaglyphs, or any other pair of 3-D viewing glasses configured to view images projected by the visual display 111 in three-dimensions. The viewer 115 may communicate with the processor 113 by way of a user interface 117, which may take on the form of a joystick, controller, remote, keyboard, or any other device that may be used in conjunction with a graphical user interface (GUI).

The viewer 115 may initially select a group of general three-dimensional video settings to be applied to every three-dimensional scene presented to the viewer 115. By way of example, and not by way of limitation, the viewer may select the outer boundaries of depth within which a three-dimensional scene is projected. As additional examples, a user may set predetermined values for stereopsis, convergence, or shadow stereopsis. Furthermore, if a user does not set predetermined values for these parameters, the predetermined values may be factory-set default values.

Examples of other 3D video parameter settings that could be set by the user and dynamically adjusted based on scene content include, but are not limited to, both the 3D depth effect and the 3D range. The depth controls how much 3D effect is apparent to the user. The outer boundaries of depth essentially represent the range and parallax (our depth and effect sliders). In implementations involving re-projection, the projection curve can be adjusted as described below. The adjustment to the re-projection curve can be an adjustment to the nature of the shape of the re-projection curve, which can be linear, or perhaps S shaped to emphasize the center. In addition, the parameters of the shape can be adjusted. By way of example, and not by way of limitation, for a linear re-projection curve, the end points or slope can be adjusted. For an S-shaped re-projection curve, adjustment can be made to how fast the S ramps, etc.

In other embodiments involving re-projection some sort of edge fuzziness can be provided for patching the holes and the viewer 115 could drive that. In addition, embodiments of the present invention using re-projection or other means can be applied to driving color contrast to help reduce ghosting—allowing a per scene adjustment based off the user scale.

Furthermore, in case not involving re-projection, the user could adjust the scaling of how far apart the input cameras would be or slight tweaks to the camera angles. Other camera settings that could be adjusted on a per-scene basis include depth of field settings or camera aperture.

Because viewer(s) 115 perceive three-dimensional visual representations differently, different viewers may have different combinations of general three-dimensional scene settings according to their preferences. For example, studies have demonstrated that older adults were less sensitive than younger adults to perceiving stereoscopic depth, and as such older adults may benefit from scene settings that augment the perception of depth. Similarly, younger adults may find that settings that reduce the perception of depth may reduce eye strain and fatigue while still affording the viewer a pleasing three-dimensional experience.

As the viewer 115 is observing a constant stream of three-dimensional scenes 103, one or more scenes that have yet to be displayed to the viewer may be stored in an output buffer 101. The scenes 103 may be arranged according to their order of presentation. A scene 103 refers to one or more three-dimensional video frames characterized by a group of shared characteristics. For example, a group of video frames representing different views of the same landscape may be characterized as a scene. However, a near-view of an object and a far-view of an object may represent different scenes. It is important to note that any number of combinations of frames may be characterized as a scene.

Before a scene 103 is presented to a viewer, it passes through two stages. The scene is first processed to determine one or more characteristics associated with the given scene 105. One or more scaling factors are then determined from those characteristics 107 to be applied to the user's predetermined settings. The scaling factors may then be transmitted to the processor 113 as metadata 109 and applied to dynamically adjust the viewer's settings, as indicated at 110. The scene may then be presented on the display 111 using the adjusted settings as indicated at 112. This allows each scene to be presented to the viewer in such a way that the viewer's basic preferences are preserved, while still maintaining the visual integrity of a scene by taking into account its particularized contents. In cases not involving re-projection the metadata can be transmitted to the capture device to make adjustments, be it our virtual camera positions in a game or a physical camera, e.g., as used in a 3D chat example.

Before illustrating an example of the invented method, it is useful to discuss some background regarding three-dimensional video systems. Embodiments of the present invention may be applied to re-projection settings for 3D video generated from 2D video by a process of re-projection. In re-projection, left and right eye virtual views of a scene can be synthesized from regular two-dimensional images and associated per-pixel depth information for each pixel in the images. This process can be implemented by the processor 113 as follows.

Figure 1B:
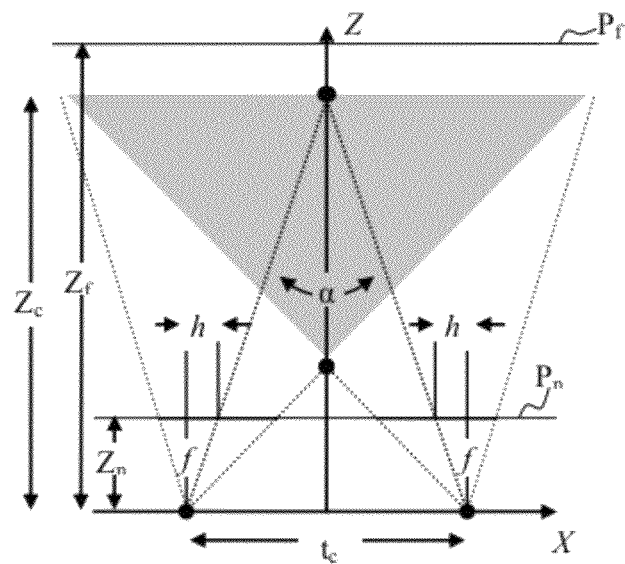
FIG. 1B is a schematic diagram illustrating the basic concept of three-dimensional re-projection.

At first, the original image points are re-projected into a 3D world, utilizing the depth data for each pixel in the original image. Thereafter, these 3D space points are projected into an image plane of a "virtual" camera, which is located at a desired viewing position. The concatenation of re-projection (2D-to-3D) and subsequent projection (3D-to-2D) is sometimes called 3D image warping or re-projection. The re-projection can be understood by comparison to the operation of "real" stereo cameras as illustrated in FIG. 1B. In "real", high-quality stereo cameras, usually one of two different methods is utilized to establish the so-called zero parallax setting (ZPS), i.e., to choose the convergence distance $Z_c$ in the 3D scene. In the "toed-in" approach, the ZPS is chosen by a joint inward rotation of the left-eye and right-eye cameras. In the shift-sensor approach, a plane of convergence distance $Z_c$ can be established by a small shift h of the image sensors for parallel positioned left-eye and right-eye "virtual" cameras, which are separated by a distance $t_c$, as shown in FIG. 1B. Each virtual camera may be characterized by a defined focal length f, which represents a distance between the virtual camera lens and the image sensor. This distance corresponds to a near plane distance $Z_n$ to a near plane $P_n$ used in some implementations described herein.

Technically, the "toed-in" approach is easier to realize in "real" stereo cameras. However, the shift-sensor approach is sometimes more preferred for re-projection because it does not introduce unwanted vertical differences, which can be a potential source of eye strain between the left-eye view and the right-eye view.

Given depth information Z for each pixel at horizontal and vertical coordinates (u,v) in the original 2D image, corresponding pixel coordinates (u', v'), (u",v") for the left-eye and right-eye views can be generated using the shift-sensor approach according to the following equations:

$$u' = u - \frac{\alpha_u t_c + t_{hmp}}{2Z} + h,$$

v'=v, for the left-eye view;

$$u'' = u + \frac{\alpha_u t_c + t_{hmp}}{2Z} + h,$$

v"=v, for the right-eye view.

In the foregoing equations, $\alpha_u$ is a convergence angle in the horizontal direction as seen in FIG. 1B. The term $t_{hmp}$ is an optional translational term (sometimes referred to as a head motional parallax term) that accounts for the actual viewing position of the viewer.

The shift h for the left-eye view and right-eye view can be related to the convergence angle $\alpha_u$, the convergence distance $Z_c$, and the horizontal convergence angle $\alpha_u$ by the following equations:

$$h = +\frac{\alpha_u t_c}{2Z_c},$$

for the left-eye view;

$$h = -\frac{\alpha_u t_c}{2Z_c},$$

for the right-eye view.

The processor 113 can receive the scene 103 in terms of original 2D images and per-pixel depth information along with per-scene default scale settings that can be applied to 3D video parameters such as $\alpha_u$, $t_c$, $Z_c$, f, and $t_{hmp}$ or combinations (e.g., ratios) thereof. For example, the scale settings can represent multipliers that range between 0 (for no 3D perception) and some value greater than 1 (for enhanced 3D perception). Changing the 3D video parameter settings for the virtual cameras affects the qualitative perception of 3D video. By way of example, and not by way of limitation, some qualitative effects of increasing (+) or decreasing (−) selected 3D video parameters are described in Table I below.

TABLE I

| Parameter | +/− | Screen parallax | Perceived depth | Object size |
|---|---|---|---|---|
| $t_c$ | + | Increase | Increase | Constant |
|  | − | Decrease | Decrease | Constant |
| F | + | Increase | Increase | Increase |
|  | − | Decrease | Decrease | Decrease |
| $Z_c$ | + | Decrease | Shift toward viewer | Constant |
|  | − | Increase | Shift away from viewer | Constant |

In Table I, the term "screen parallax" refers to horizontal differences between the left-eye and right-eye views; the term "perceived depth" refers to the apparent depth of the displayed scene as perceived by the viewer; the term "object size" refers to the apparent size of an object displayed on the screen 111 as perceived by the viewer.

In some implementations the mathematical equations used above can be described in terms of a near plane $P_n$ and far plane $P_f$ instead of the convergence angle $\alpha_u$ and the sensor separation $t_c$. The term "near plane" refers to the closest point in a scene captured by the camera—i.e., the image sensor. The term "far plane" refers to the farthest point in a scene captured by the camera. No attempt is made to render anything beyond the far plane $P_f$, i.e., beyond a far plane distance $Z_f$, as depicted in FIG. 1B. A system using the mathematical equations described above can select the near and far plane indirectly by selecting the values of certain variables within the equations. Alternatively, the values of the convergence angle $\alpha_u$ and the sensor separation $t_c$ can be adjusted based on chosen near plane and far plane.

The operating requirements of a three-dimensional re-projection system can be described as follows: 1) selection of the near plane of a given scene; 2) selection of the far plane of a given scene; 3) defining a transition from the near plane to the far plane for re-projection of the given scene. The transition, sometimes referred to as the re-projection curve, basically relates the amount of horizontal and vertical pixel shift to the pixel depth; 4) a method for filtering and/or weighting of unimportant/important pixels; 5) a system for smoothing any changes to 1-3 that may occur during scene transitions in order to prevent jarring cuts of depth perceived by the viewer 115. Three-dimensional video systems also often include 6) some mechanism to allow the viewer to scale the three-dimensional effect.

Typical re-projection systems specify the above 6 requirements as follows: 1) the scene's camera's near plane; 2) the scene's camera's far plane; 3) a transition in which pixels shift only horizontally. A fixed shift amount (typically called convergence) is adjusted down by an inversely proportionate amount to the depth value of each pixel—the deeper or farther the pixel is the less the pixel shifts from the convergence. This requirement can be described, e.g., by the mathematical equations provided above; 4) no weighting necessary because 1-3 are constant; 5) no smoothing necessary because 1-3 are constant; and 6) a slider may be used to adjust the transition, e.g., by linearly scaling the amount a pixel will shift. This is equivalent to adding a constant scale factor to the second (and potentially third) terms in the equations for u' or u'' from above. Such constant scale factors could be implemented via a user-adjustable slider that tends to move the near and far planes (and thus the average) towards the screen plane.

This can lead to poor usage of three-dimensional space. A given scene may be unbalanced and cause unnecessary eye fatigue. A 3D video editor or 3D game developer has to carefully construct all scenes and cinematics such that all objects within a scene are laid out correctly.

For a given three-dimensional video, there is a comfort zone 121 of viewing that sits in an area close to the visual display. The farther a perceived image is from the screen, the more uncomfortable it is to view (for the majority of people). As such, the three-dimensional scene settings associated with a given scene look to maximize the usage of the comfort zone 121. While some things can be outside the comfort zone 121, it is generally desirable for the majority of what the viewer focuses on to be within the comfort zone 121. By way of example, and not by way of limitation, the viewer could set the boundaries of the comfort zone 121, while the processor 113 could dynamically adjust scene settings such that usage of the comfort zone 121 is maximized for each scene.

A naïve approach to maximizing the usage of the comfort zone 121 could involve setting the near plane equal to the minimum pixel depth associated with a given scene, and setting the far plane equal to the maximum pixel depth associated with a given scene, while leaving properties 3-6 as defined above for typical re-projection systems. This would maximize the usage of the comfort zone 121, but it fails to consider the effects of objects that fly in or out of the scene that may cause a huge shift in the three-dimensional space.

By way of example, and not by way of limitation, certain embodiments of the invented method may additionally take into account an average depth of the scene. The average depth of the scene could be driven towards a target. The three-dimensional scene data may set the target for a given scene, while allowing the user to scale how far from the target they perceive the scene (e.g., the boundary of comfort zone).

Pseudo-code for computing such an average may be envisaged as follows:

```
minValue = z_Far
maxValue = z_Near
average = 0
For each pixel
    average += pixel.depth
    minValue = min( minValue, pixel.depth )
    maxValue = max( maxValue, pixel.depth )
average = average / pixel.totalCount
```

The near plane value may be set to the minimum depth value for all pixels in the scene and the far plane may be set to the maximum depth value for all the pixels in the scene. The target perceived depth can be a value specified by the content creator and scaled by the user's preference. By using the calculated average with the transition property 3 from above, it is possible to calculate how far off the average scene depth is from the target perceived depth. By way of example, and not by way of limitation, the overall perceived scene depth could then be shifted by simply adjusting convergence with the target delta (as shown in Table 1). The target delta could also be smoothed as is done for near and far plane below. Other methods of adjusting the target depth could also be used such as ones that are used in 3D movies to ensure consistent depth across scene changes. It is noted, however, that 3D movies do not currently provide a method for viewers to adjust the target scene depth.

By way of example, and not by way of limitation, one approach to determining one or more three-dimensional characteristics associated with a given scene is to determine and use two important scene characteristics: a mean pixel depth of the scene and a standard deviation for the pixel depth of that scene. Pseudo-code for calculating mean and standard deviation of the pixel depth can be envisaged as follows:

```
mean = 0
For each pixel
    mean += pixel.depth
mean = mean / pixel.totalCount
variance = 0
For each pixel
    variance += (pixel.depth - mean)²
standardDeviation = squareRoot( variance )
```

The near plane may then be set to the mean pixel depth of the scene minus a standard deviation for the pixel depth of that scene. Likewise, the far plane may be set to the mean pixel depth of the scene plus a standard deviation for the pixel depth of that scene. If these results are insufficient, the re-projection system could transform the data representing the scene into a frequency domain for calculation of a mean pixel depth and standard deviation for a given scene. Like in the above example driving to the target depth can be done in the same manner.

To provide a method for filtering and weighting of unimportant pixels, a scene may be traversed and unimportant pixels tagged. Unimportant pixels would likely include particle flybys and other irrelevant small geometries. In the context of a video game this can easily be done during rasterization, otherwise an algorithm for finding small clusters of depth disparities would likely be used. If a method is available to tell where the user is focused the depths of the pixels nearby should be considered more important—the farther we get from the focus point the more unimportant the pixel. Such a method could include, without limitation, determining whether a cursor or reticle is within the image and the location therein, or by measuring rotation of the eye with feedback from specialized glasses. Such glasses may include simple cameras directed at the wearer's eyeballs. The cameras can provide images in which the whites of the user's eyes can be distinguished from the darker parts (e.g., the pupils). The eyeball rotation can be determined by analyzing the images to determine the location of the pupils and correlating the location to an eyeball angle. For example, a centered pupil would correspond roughly to an eyeball oriented straight ahead.

In some embodiments it may be desirable to emphasize pixels within a center portion of the display 111, since values at the edge may likely be less important. If distance between pixels is defined to be the two-dimensional distance ignoring depth, then using a simple biased weighting statistical model emphasizing such central pixels or focus points may be envisaged with the following pseudo code:

```
mean = 0
weight = 0
For each pixel
    distanceFactor = (maxAllowedDistance - pixel.distanceFromFocus) /
        maxAllowedDistance
    distanceFactor = max(distance, 0.0)
    If (pixel.isImportant( ))
        mean += pixel.depth * distanceFactor
        weight += distanceFactor
mean = mean / weight
variance = 0
For each pixel
    distanceFactor = (maxAllowedDistance - pixel.distanceFromFocus) /
        maxAllowedDistance
    distanceFactor = max(distance, 0.0)
    If (pixel.isImportant( ))
        variance += distanceFactor * (pixel.depth - mean)²
variance = variance / weight
standardDeviation = squareRoot( variance )
```

In order to provide a system that keeps the majority of the picture within the comfort zone 121 the near plane, and far plane (or in the mathematical equations described above the other variables) should be adjusted in addition or instead to the convergence described in the example above. The processor 113 can be configured to implement a process like the one envisaged by the following pseudo code:

1- scale=viewerScale*contentScale
2- nearPlane'=nearPlane*scale+(mean−standardDeviation)*(1−scale)
3- farPlane'=farPlane*scale+(mean+standardDeviation)*(1−scale)

Both viewerScale and contentScale are values between 0 and 1 that control the rate of change. The viewer 115 adjusts the value of viewerScale, whereas the content creators set the value of contentScale. The same smoothing can be applied to the convergence adjust above.

Since, in certain implementations, such as video games, it may be desirable for the processor 113 to be able to drive objects within a scene to be farther or closer to the screen 111 it may be useful to add a target adjust step as such:

1- nearPlane'=nearPlane*scale+(mean+nearShift−standardDeviation)*(1−scale)
2- farPlane'=farPlane*scale+(mean+farShift+standardDeviation)*(1−scale)

A positive shift will tend to move the nearPlane and farPlane back into the scene. Likewise a negative shift will move things closer.

After determining the one or more characteristics (e.g., near plane, far plane, mean pixel depth, standard deviation pixel depth, etc.) of the given scene 105 a set of scale factors may be determined 107. These scale factors may dictate how the scene is maximized within the boundaries of the user-determined comfort zone 121. Additionally, one of these scale factors may be used to control the rate at which three-dimensional settings are modified during scene transitions.

Once scale factors corresponding to the characteristics of a given scene are determined, they may be stored as metadata 109 within the three-dimensional scene data. The scene 103 (and its accompanying three-dimensional data) may be transmitted along with the metadata 109 associated with that scene to the processor 113. The processor 113 may then adjust the three-dimensional scene settings in accordance with the metadata.

It is important to note that a scene may be processed to determine scale factors and metadata at different stages of the three-dimensional data streaming process and is not limited to being processed subsequent to placement in the output buffer 101. Moreover, the user-determined set of three-dimensional scene settings is not limited to setting the boundaries of three-dimensional projection. By way of example, and not by way of limitation, the user-determined scene settings could also include controlling the sharpness of objects within a three-dimensional scene or the intensity of shadows within the three-dimensional scene.

Figure 1C:
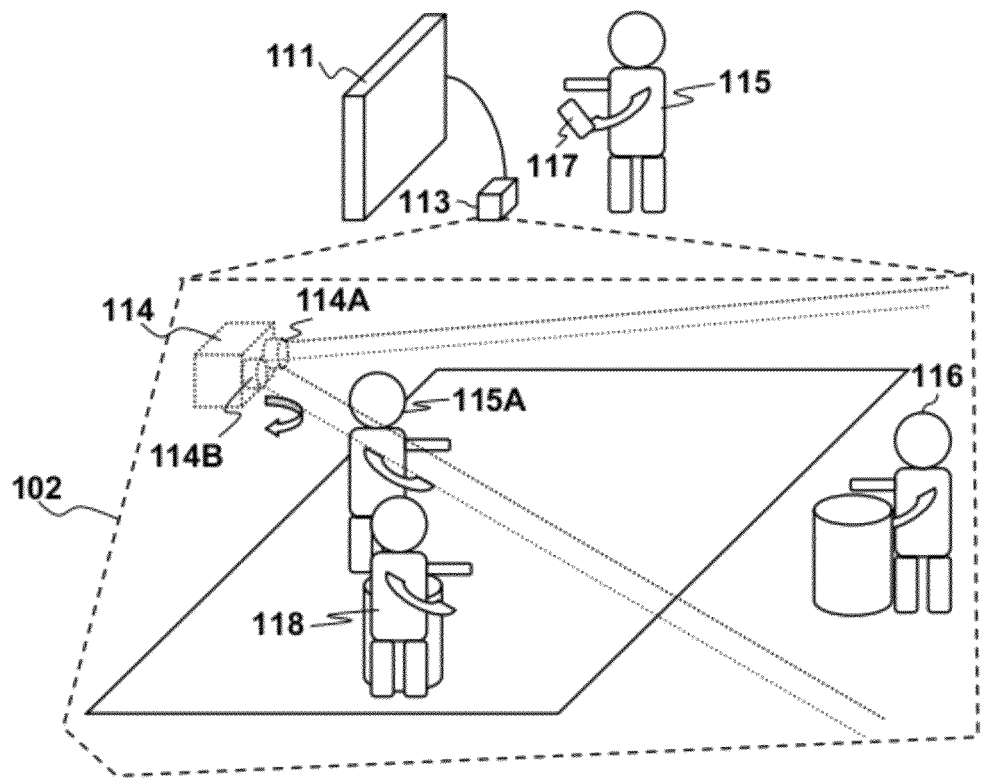
FIG. 1C is a simplified diagram illustrating an example of virtual camera adjustment of 3D video settings according to an embodiment of the present invention.
Figure 1D:
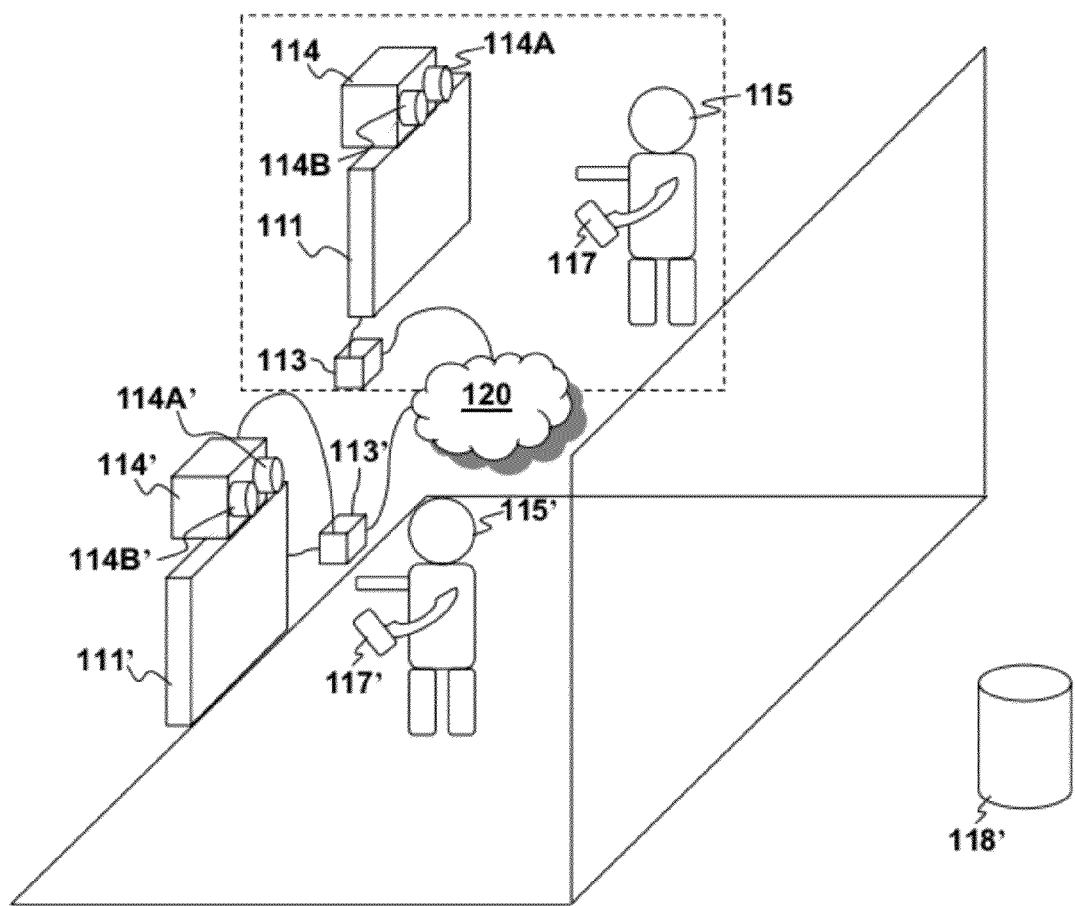
FIG. 1D is simplified diagram illustrating an example of mechanical camera adjustment of 3D video settings according to an embodiment of the present invention.

Although the foregoing example is described in the context of re-projection embodiments of the present invention are not limited to such implementations. The concept of scaling depth and range for re-projection can apply equally well to adjusting the input parameters, e.g., locations of virtual or real stereoscopic cameras, for real-time 3D video. Adjusting the input parameters for real-time stereoscopic content can be implemented if the camera feeds are dynamic. FIG. 1C and FIG. 1D illustrate examples of dynamic adjustment of camera feeds in accordance with alternative embodiments of the present invention.

As seen in FIG. 1C, the processor 113 can generate the left-eye and right-eye views of a scene 103 from three-dimensional data representing the locations of objects and virtual stereo cameras 114 including left-eye and right-eye cameras 114A, 114B in a simulated environment 102, such as a location in a video game or virtual world. For the purposes of example, the virtual stereo cameras may be regarded as part of a unit having two separate cameras. However, embodiments of the invention include implementations where the virtual stereo cameras are separate and not part of a unit. It is noted that the location and orientation of the virtual cameras 114A, 114B determines what is displayed in the scene. For example, suppose that the simulated environment is a level of a first-person shooter (FPS) game in which an avatar 115A represents the user 115. The user controls the movements and actions of the avatar 115A through use of the processor 113 and a suitable controller 117. The processor 113 can select the location and orientation of the virtual cameras 114A, 114B in response to user commands. If the virtual cameras are pointing at a distant object, such as a non-player character 116, the scene may have more depth than if the cameras are pointing toward a nearby object such as non-player character 118. The locations of these objects relative to the virtual cameras can all be determined by the processor from the three-dimensional information generated by a physics simulator component of the game. Depths to objects that are in the cameras' fields of view can be computed for the scene. Average depths, maximum depths, depth ranges, and the like can then be computed for the scene and these per-scene values can be used to select default values and/or scale factors for 3D parameters such as $\alpha_u$, $t_c$, $Z_c$, f, and $t_{hmp}$. By way of example, and not by way of limitation, processor 113 may implement a look-up table or function that relates specific 3D parameters to specific combinations of per-scene values. The tabular or functional relationship between the 3D parameters and default per-scene values and/or scale factors may be determined empirically. The processor 113 can then modify the individual default values and/or scale factors according to the user's preferred settings.

In a variation on the embodiments depicted in FIGS. 1A-1C, it is also possible to implement a similar adjustment of 3D parameter settings with motorized physical stereo cameras. For example, consider a video chat example, e.g., as depicted in FIG. 1D. In this case first and second users 115, 115' interact via respective first and second processors 113, 113', first and second 3D video cameras 114, 114', and first and second controllers 117, 117'. The possessors 113, 113' are coupled to each other, e.g., by a network 120, which can be a wired or wireless network, local area network (LAN), wide area network, or other communications network. The first user's 3D video camera 114 includes a left-eye camera 114A and a right-eye camera 114B. Left-eye and right-eye images of the first user's environment are displayed on a video display 111' coupled to the second user's processor 113'. In a like manner, the second user's 3D video camera 114' includes left-eye and right-eye cameras 114A', 114B'. For the purposes of example, the left eye and right eye stereo cameras may be physically part of a unit having two integrated cameras, e.g., separate lens units and separate sensors for the left and right views. However, embodiments of the invention include implementations where the virtual left-eye and right-eye cameras are physically independent from each other and not part of a unit.

Left-eye and right-eye images of the second user's environment are displayed on a video display 111 coupled to the first user's processor 113. The first user's processor 113 can determine per-scene 3D values from the left-eye and right-eye images. For example, two cameras typically capture color buffers. Depth information could be recovered from the color buffer information for the left-eye and right-eye cameras with a suitable depth recovery algorithm. The processor 113 can transmit the depth information along with the images to the second user's processor 113'. It is noted that the depth information may vary depending on scene content. For example, the scene captured by the cameras 114A', 114B' may contain objects at different depths, such as the user 115' and a distant object 118'. The differing depths to these objects within the scene can affect the average pixel depth and standard deviation of the pixel depth for the scene.

The left-eye and right eye cameras for both the first user's camera 114 and the second user's camera 114' can be motorized so that the values of parameter such as f, $t_c$, and "toe-in" angle for the left-eye and right-eye cameras can be adjusted on the fly. The first user's can choose initial settings for the 3D video parameters of the camera 114 such as the inter-camera spacing $t_c$, and/or relative horizontal rotational angles for the left-eye and right-eye cameras 114A, 114B (for "toe-in"). The second user 115' can adjust the settings of the 3D video parameters for the first user's camera 114 (e.g., f, $t_c$, or toe-in angle) using the second controller 117' and second processor 113' to adjust scale factors, e.g., as described above. Data representing the adjustments to the scale factors can then be transmitted to the first processor 113 via the network 120. The first processor can use the adjustments to adjust the 3D video parameter settings of the first user's camera 114. In a similar manner, the first user 115 can adjust the settings of the second user's 3D video camera 114. In this way, each user 115, 115' can view 3D video images of the other's environment at comfortable 3D settings.

Scaling Pixel Depth Values of User-Controlled Virtual Object in Three-Dimensional Scene Improvements in three-dimensional image rendering have had a major impact in the area of interactive virtual environments that employ three-dimensional technologies. Many video games implement three-dimensional image rendering to create virtual environments for user-interaction. However, simulating real world physics to facilitate user-interaction with virtual worlds is very costly and quite difficult to implement. As such, certain unwanted visual irregularities may occur during execution of a game.

A problem arises when artifacts of the three-dimensional video result in the user-controlled virtual objects (e.g., character and gun) penetrating other elements in the virtual world (e.g., background landscape). When a user-controlled virtual object penetrates other elements in the virtual world, the game's sense of realism is diminished greatly. In the context of a first-person shooter, the first-person's sight may be obstructed or perhaps certain important elements may be hidden from view. As such it is necessary for any program that features user-controlled virtual object interaction within a three-dimensional virtual environment to eliminate the occurrence of these visual irregularities.

Embodiments of the present invention can be configured to scale a user-controlled virtual object pixel depth to address issues of user controlled virtual objects penetrating elements of a three-dimensional scene of a virtual world. In the context of a first person shooter (FPS) video game, a likely example would be the end of the gun barrel as seen from the shooter's point of view.

Figure 2A:
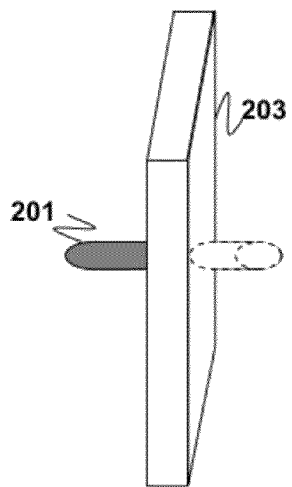
FIGS. 2A-2B are schematic diagrams illustrating the problem of a user-controlled virtual object penetrating an element of a virtual world in a three-dimensional scene.
Figure 2B:
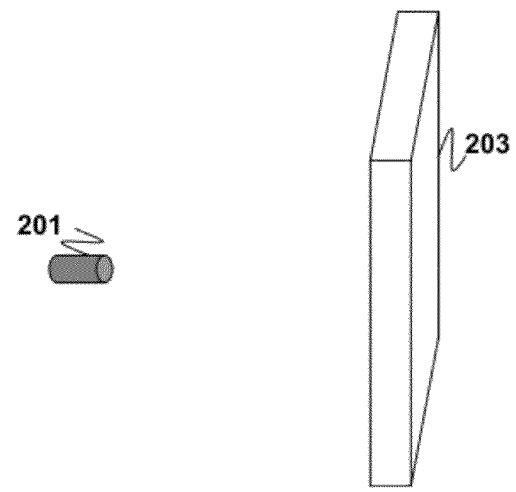

FIGS. 2A-2B illustrate the problem of a user-controlled virtual object penetrating an element of the virtual world in a three-dimensional scene generated using re-projection. When a user-controlled virtual object penetrates other elements in the virtual world the game's sense of realism is diminished greatly. As shown in FIG. 2A in a virtual environment (e.g., scene) where no scaling of pixel depth values of user-controlled virtual objects is performed a user-controlled virtual object 201 (e.g., a gun barrel) may penetrate another element 203 of the virtual world (e.g., a wall) causing potential obstruction of view and diminished sense of realism, as discussed above. In the context of a first-person shooter, the first-person's sight may be obstructed or perhaps certain important elements (e.g., the end of the gun barrel) may be hidden from view. Hidden elements are shown in phantom in FIG. 2A.

A common solution for two-dimensional first person video games is to scale the depth of objects in the virtual world to eliminate the visual artifacts in the two-dimensional images (or exchange the artifacts for different artifacts that are not as noticeable). The scaling is usually applied during rasterization of the two-dimensional video images. In the first person shooter example, this means that the viewer would see the tip of the gun barrel 201 regardless of if it physically is through the wall 203. The solution works well enough for two-dimensional video, however problems occur when this solution is applied to three-dimensional video. The problem is that the scaled depth values no longer represent real points in three dimensions with respect to the rest of the two-dimensional image. Consequently, when re-projection is applied to generate left-eye and right-eye views, the depth scaling causes the objects to appear compressed in the depth dimension and in the wrong location. For example, as shown in FIG. 2B, the gun barrel 201 is now perceived to be "crushed" in the depth direction and located extremely close to the viewer when it should be a lot closer to the physical screen. Another problem in re-projection is that the depth scaling also ends up leaving large holes in the images that are hard to fill.

Additionally scaling back the depth to the original values or rewriting the depth values with the true depth values from the three-dimensional scene information means that the viewer will still see the gun barrel but it will be perceived to be behind the wall. The viewer would see the phantom portion of virtual object 201 despite the fact that it should be occluded by the wall 203. This depth piercing effect is discomforting because the viewer expects to still see the wall.

Figure 2C:
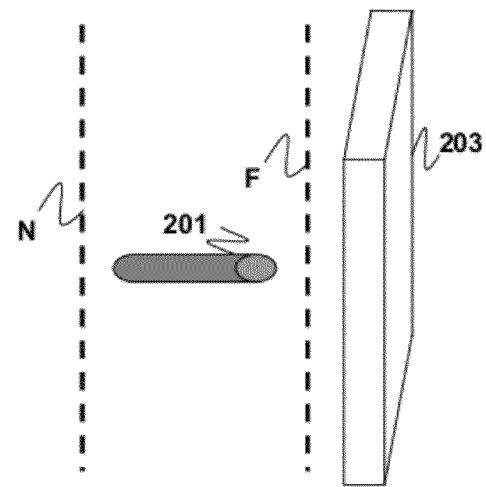
FIG. 2C is a schematic diagram illustrating scaling of pixel depth values to solve the problem of a user-controlled virtual object penetrating an element of a virtual world in a three-dimensional scene.

To solve this problem embodiments of the invention apply a second set of scaling to the objects in the scene to place them into the appropriate perceived location within the scene. The second scaling can be applied after rasterization of a two-dimensional image but before or during re-projection of the image to generate left-eye and right-eye views. FIG. 2C, illustrates a virtual environment (e.g., scene) where scaling of the user-controlled virtual object pixel depth values is performed. Here, the user-controlled virtual object 201 may come near another element 203 of the virtual world, but is restricted from penetrating the element 203 through the scaling of pixel depths as discussed above. The second scaling limits depth values to lie between a near value N and a far value F. In essence an object may still appear to be crushed in the depth dimension but full control can be exerted over its thickness. This is a balance, and of course the viewer can be provided with control over this second scaling, e.g., as discussed above.

As such, the visual irregularities caused by penetration of the user-controlled virtual object through an element of the virtual world can be eliminated or significantly reduced.

Figure 3:
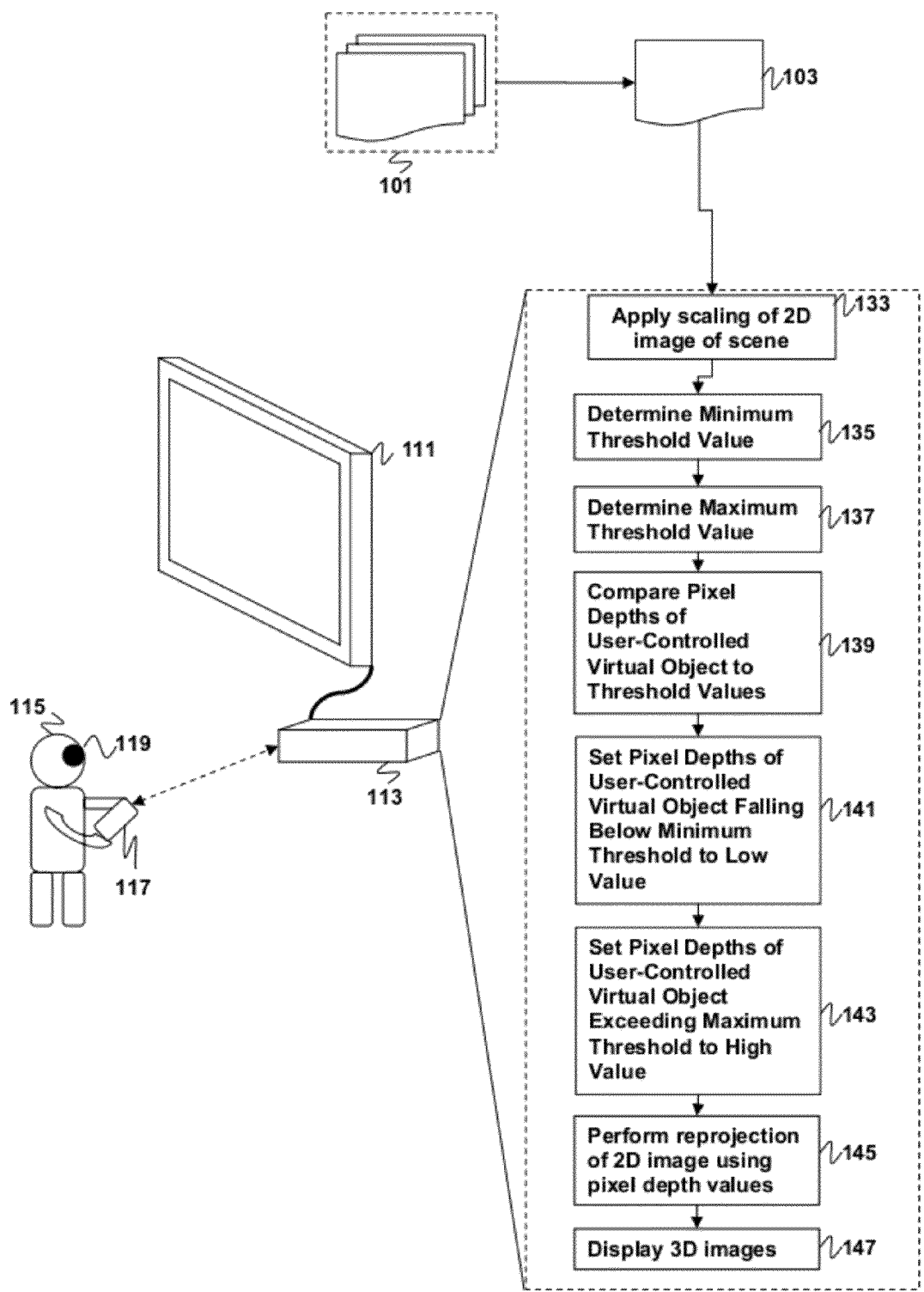
FIG. 3 is a flow diagram illustrating a method for scaling pixel depth values of a user-controlled virtual object in a three-dimensional scene according to an embodiment of the present invention.

FIG. 3 is a flow diagram illustrating a method for scaling pixel depth values of a user-controlled virtual object in a three-dimensional scene according to an embodiment of the present invention.

To account for this problem, the program may apply a second scaling of pixel depth values of the user-controlled virtual object according to the three-dimensional scene content to be presented to the user.

Before a scene 103 is presented to a user, it may sit in an output buffer 101. These scenes 103 may be arranged according to their order of presentation. A scene 103 refers to one or more three-dimensional video frames characterized by a group of shared characteristics. For example, a group of video frames representing different views of the same landscape may be characterized as a scene. However, a near-view and far-view of the same object may also represent different scenes. It is important to note that any number of combinations of frames may be characterized as a scene.

As indicated at 133 an initial depth scaling on a two-dimensional image of the three-dimensional scene 103. The initial depth scaling is usually performed during rasterization of the two-dimensional image using a modified view-projection matrix. This writes scaled depth information into the depth buffer for the scene.

Before the scene 103 is presented to the user three-dimensionally, e.g., as left-eye and right-eye views, it may be traversed to determine important characteristics that are critical to solving the problem discussed above. For a given scene 103, the minimum threshold value is first determined as indicated at 135. This minimum threshold value represents a minimum pixel depth value that any segment of the user-controlled virtual object must not fall below. Next, the maximum threshold value is determined as indicated at 137. The maximum threshold value represents a maximum pixel depth value that any segment of the user-controlled virtual object must not exceed. These threshold values set a limit as to where a user-controlled virtual object may travel within a virtual environment, such that the user-controlled virtual object is restricted from penetrating other elements in the virtual environment.

As the user-controlled virtual object moves within the virtual world, their pixel depth values for the virtual object are tracked and compared to that of the threshold values determined above as indicated at 139. Whenever the pixel depth values of any segment of the user-controlled virtual object falls below the minimum threshold value, those pixel depths values are set to a low value as indicated at 141. By way of example, and not by way of limitation, this low value may be the minimum threshold value. Alternatively, this low value may be scaled versions of the user-controlled virtual object pixel depth value. For example, the low value may be determined by multiplying the pixel depth values falling below the minimum threshold value by an inverse scale and then adding the product to a minimum offset.

Whenever the pixel depth values of any segment of the user-controlled virtual object exceeds the maximum threshold value, those pixel depth values are set to a high value as indicated at 143. By way of example, and not by way of limitation, this high value may be the maximum threshold value. Alternatively, this high value may be scaled versions of the user-controlled virtual object pixel depth values. For example, the high value may be determined by multiplying the pixel depth value exceeding the maximum threshold value by an inverse scale and subtracting the product from a maximum offset.

Setting the low/high value to the minimum/maximum threshold value works especially well for virtual objects that are thin in nature that do not require an enhanced perception of depth. These low/high values effectively shift the virtual object away from the virtual camera. However, for virtual objects that require an enhanced perception of depth, such as a gunsight, the scaled low/high values mentioned above may operate more effectively.

The minimum and maximum threshold values may be determined by the program prior to its execution by the processor 113. These values may also be determined by the processor 113 while executing the contents of the program. The comparison of pixel-depth values of user-controlled virtual objects to the threshold values is completed by the processor 113 during the execution of the program. Similarly, establishment of low and high values for user-controlled virtual object pixel depths exceeding or falling below threshold values is completed by the processor during execution of the program.

After the second scaling has been performed on the pixel depth values the processor 113 may perform a re-projection using the two-dimensional image and using the resulting set of pixel depth values for the user-controlled virtual object to generate two or more views of the three-dimensional scene (e.g., left-eye and right-eye views), as indicated at 145. The two or more views may be displayed on a three-dimensional display, as indicated at 147.

By setting any pixel depth values of user-controlled virtual objects exceeding threshold values to low and high values, the problem of penetrating other virtual world elements is solved. While simulating the physics of a virtual object's interaction with its virtual world would effectively solve this issue, it is quite difficult to implement in reality. As such, the ability to scale pixel depth values of user-controlled virtual objects according to the method described above provides a simple, cost-effective solution to the problem.

Apparatus

Figure 4:
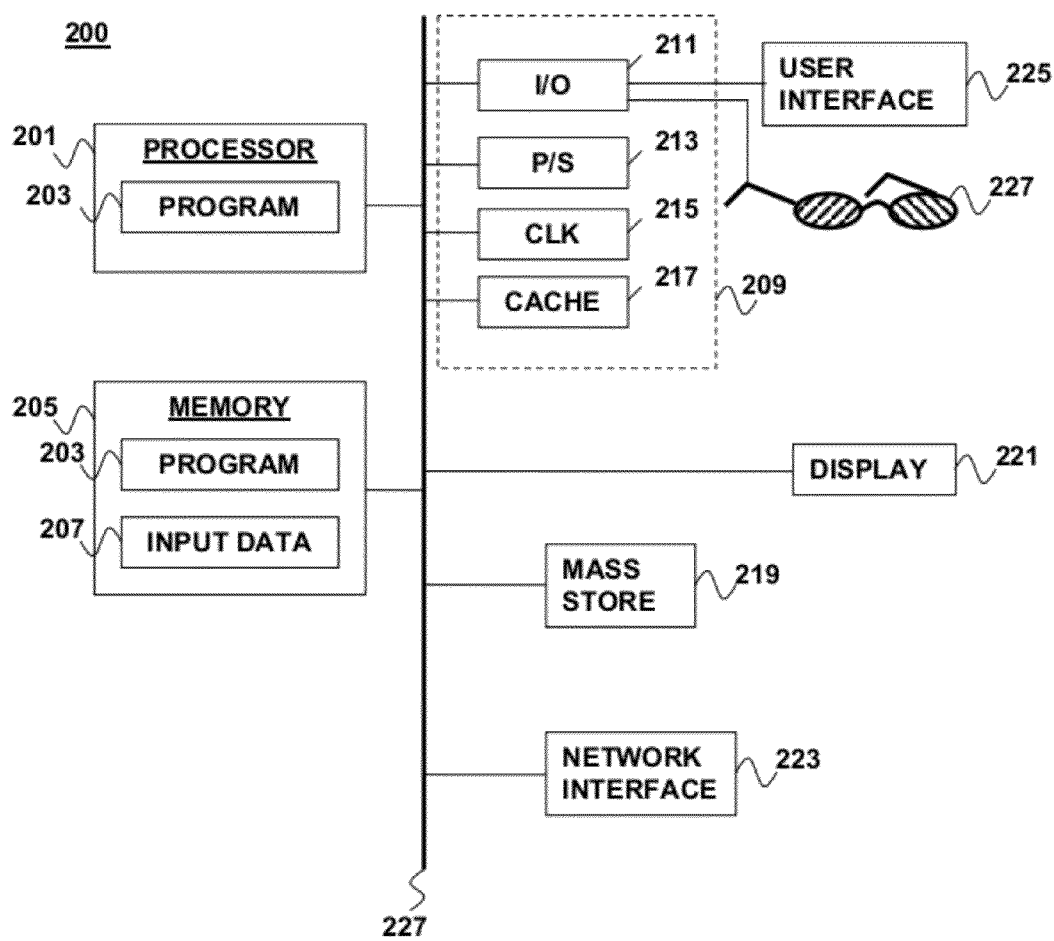
FIG. 4 is a block diagram illustrating an apparatus for implementing dynamic adjustment of user-determined three-dimensional scene settings and/or scaling pixel depth values of a user-controlled virtual object in a three-dimensional scene according to embodiments of the present invention.

FIG. 4 illustrates a block diagram of a computer apparatus that may be used to implement dynamic adjustment of user-determined three-dimensional scene settings and/or scaling of pixel depth values according to embodiments of the present invention. The apparatus 200 generally may include a processor module 201 and a memory 205. The processor module 201 may include one or more processor cores. An example of a processing system that uses multiple processor modules, is a Cell Processor, examples of which are described in detail, e.g., in Cell Broadband Engine Architecture, which is available online at http://www-306.ibm.com/chip/techlib/techlib.nsf/techdocs/1AEEE1270EA2776387257060006E61B A/$file/CBEA_01_pub.pdf, which is incorporated herein by reference.

The memory 205 may be in the form of an integrated circuit, e.g., RAM, DRAM, ROM, and the like. The memory 205 may also be a main memory that is accessible by all of the processor modules. In some embodiments, the processor module 201 may have local memories associated with each core. A program 203 may be stored in the main memory 205 in the form of processor readable instructions that can be executed on the processor modules. The program 203 may be configured to perform dynamic adjustment on a set of user-determined three-dimensional scene settings. The program 203 may also be configured to perform scaling of pixel depth values of a user-controlled virtual object in a three-dimensional scene, e.g., as described above with respect to FIG. 3. The program 203 may be written in any suitable processor readable language, e.g., C, C++, JAVA, Assembly, MATLAB, FORTRAN, and a number of other languages. Input data 207 may also be stored in the memory. Such input data 207 may include a set of user-determined three-dimensional settings, three-dimensional characteristics associated with a given scene, or scale factors associated with certain three-dimensional characteristics. The input data 207 may also include threshold values associated with a three-dimensional scene as well as pixel depth values associated with a user-controlled object. During execution of the program 203, portions of program code and/or data may be loaded into the memory or the local stores of processor cores for parallel processing by multiple processor cores.

The apparatus 200 may also include well-known support functions 209, such as input/output (I/O) elements 211, power supplies (P/S) 213, a clock (CLK) 215, and a cache 217. The apparatus 200 may optionally include a mass storage device 219 such as a disk drive, CD-ROM drive, tape drive, or the like to store programs and/or data. The device 200 may optionally include a display unit 221 and user interface unit 225 to facilitate interaction between the apparatus and a user. By way of example, and not by way of limitation, the display unit 221 may be in the form of a 3-D ready television set that displays text, numerals, graphical symbols or other visual objects as stereoscopic images to be perceived with a pair of 3-D viewing glasses 227, which can be coupled to the I/O elements 211. Stereoscopy refers to the enhancement of the illusion of depth in a two-dimensional image by presenting a slightly different image to each eye. The user interface 225 may include a keyboard, mouse, joystick, light pen, or other device that may be used in conjunction with a graphical user interface (GUI). The apparatus 200 may also include a network interface 223 to enable the device to communicate with other devices over a network, such as the internet.

The components of the system 200, including the processor 201, memory 205, support functions 209, mass storage device 219, user interface 225, network interface 223, and display 221 may be operably connected to each other via one or more data buses 227. These components may be implemented in hardware, software, or firmware or some combination of two or more of these.

There are a number of additional ways to streamline parallel processing with multiple processors in the apparatus. For example, in some implementations it is possible to "unroll" processing loops, e.g., by replicating code on two or more processor cores and having each processor core implement the code to process a different piece of data. Such implementations may avoid a latency associated with setting up the loop. As applied to embodiments of the present invention, multiple processors could determine scale factors for different scenes in parallel. The ability to process data in parallel can also save valuable processing time, leading to a more efficient and streamlined system for scaling pixel depth values corresponding to one or more user-controlled virtual objects in a three-dimensional scene. The ability to process data in parallel can also save valuable processing time, leading to a more efficient and streamlined system for dynamic adjustment of a set of three-dimensional user-determined scene settings.

Figure 5:
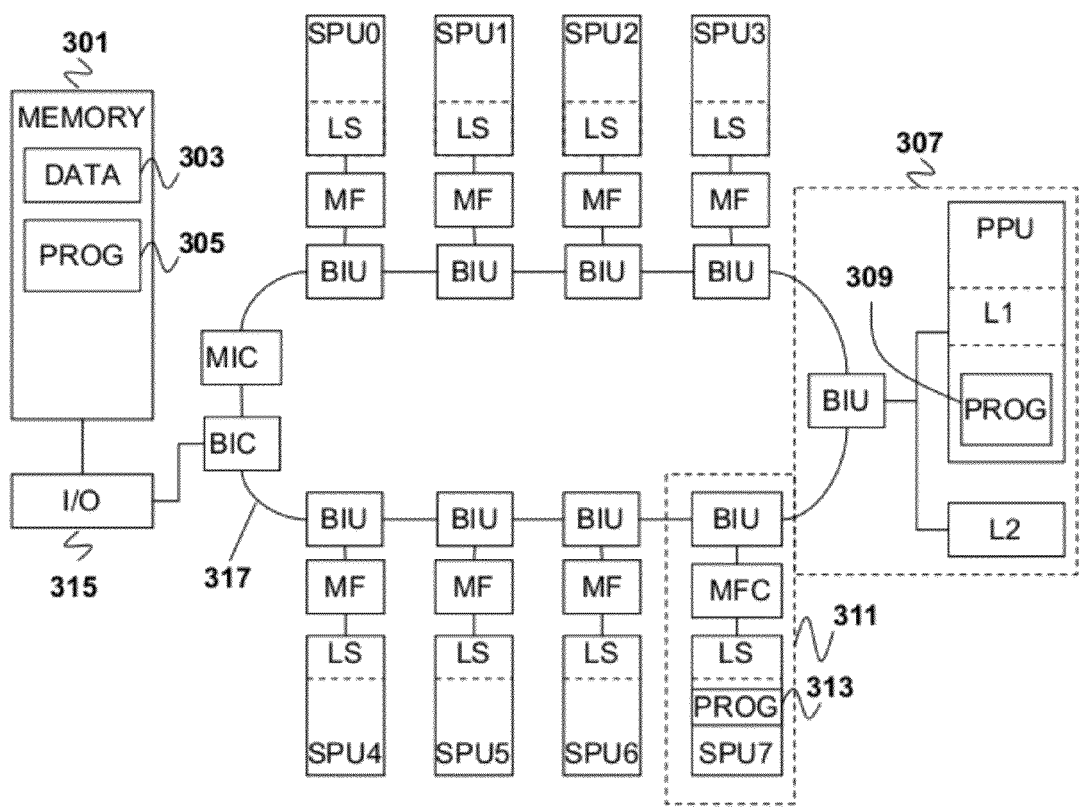
FIG. 5 is a block diagram illustrating an example of a cell processor implementation of an apparatus for implementing dynamic adjustment of user-determined three-dimensional scene settings and/or scaling pixel depth values of a user-controlled virtual object in a three-dimensional scene according to embodiments of the present invention.

One example, among others of a processing system capable of implementing parallel processing on three or more processors is a cell processor. There are a number of different processor architectures that may be categorized as cell processors. By way of example, and without limitation, FIG. 5 illustrates a type of cell processor. The cell processor 300 includes a main memory 301, a single power processor element (PPE) 307, and eight synergistic processor elements (SPE) 311. Alternatively, the cell processor may be configured with any number of SPEs. With respect to FIG. 3, the memory 301, PPE 307 and SPEs 311 can communicate with each other and with an I/O device 315 over a ring-type element interconnect bus 317. The memory 301 contains input data 303 having features in common with the input data described above and a program 305 having features in common with the program described above. At least one of the SPEs 311 may include in its local store (LS) program instructions 313 and/or a portion of the input data 303 that is to be processed in parallel, e.g., as described above. The PPE 307 may include in its L1 cache program instructions 309. The program instructions 309, 313 may be configured to implement embodiments of the invention, e.g., as described above with respect to FIG. 1 or FIG. 3. By way of example, and not by way of limitation, the instructions 309, 313 may have features in common with the program 203 described above. Instructions 309,313 and data 303 may also be stored in memory 301 for access by the SPE 311 and PPE 307 when needed.

By way of example, and not by way of limitation, the instructions 309, 313 may include instructions for implementing dynamic adjustment of user-determine three-dimensional scene setting instructions as described above, with respect to FIG. 1. Alternatively, the instructions 309, 313 may be configured to implement scaling of pixel depth values of a user-controlled virtual object, e.g., as described above with respect to FIG. 3.

By way of example, the PPE 307 may be a 64-bit PowerPC Processor Unit (PPU) with associated caches. The PPE 307 may include an optional vector multimedia extension unit. Each SPE 311 includes a synergistic processor unit (SPU) and a local store (LS). In some implementations, the local store may have a capacity of e.g., about 256 kilobytes of memory for programs and data. The SPUs are less complex computational units than the PPU, in that they typically do not perform system management functions. The SPUs may have a single instruction, multiple data (SIMD) capability and typically process data and initiate any required data transfers (subject to access properties set up by a PPE) in order to perform their allocated tasks. The SPUs allow the system to implement applications that require a higher computational unit density and can effectively use the provided instruction set. A significant number of SPUs in a system, managed by the PPE allows for cost-effective processing over a wide range of applications. By way of example, the cell processor may be characterized by an architecture known as Cell Broadband Engine Architecture (CBEA). In CBEA-compliant architecture, multiple PPEs may be combined into a PPE group and multiple SPEs may be combined into an SPE group. For purposes of example, the cell processor is depicted as having a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in Cell Broadband Engine Architecture, which is available online at: https://www-306.ibm.com/chips/techlib/techlib.nsf/techdocs/1AEEE1270EA277638725706000E61B A/$file/CBEA_01_pub.pdf, which is incorporated herein by reference.

Figure 6A:
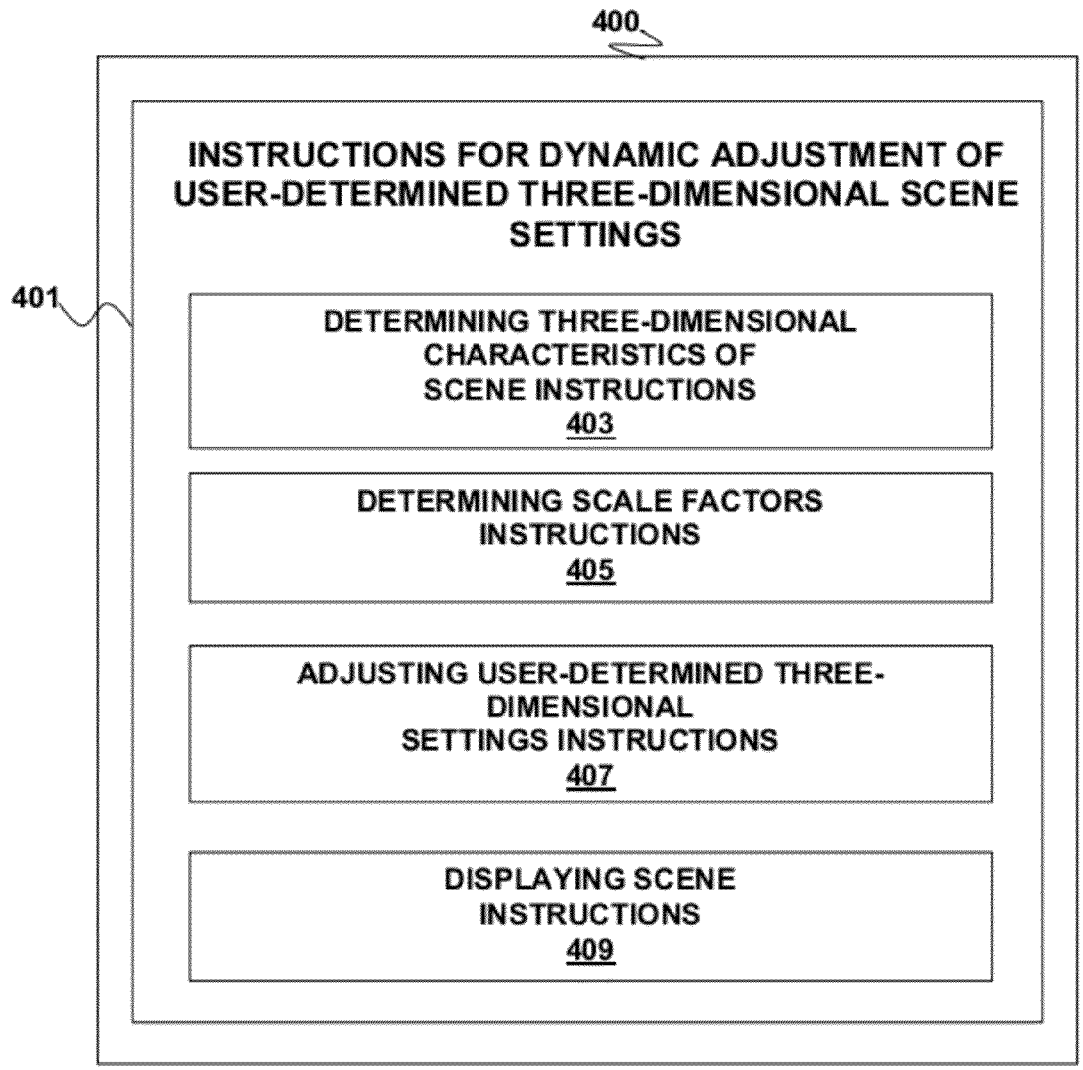
FIG. 6A illustrates an example of a non-transitory computer-readable storage medium with instructions for implementing dynamic adjustment of user-determined three-dimensional scene settings according to an embodiment of the present invention.

According to another embodiment, instructions for dynamic adjustment of user-determined three-dimensional scene settings may be stored in a computer readable storage medium. By way of example, and not by way of limitation, FIG. 6A illustrates an example of a non-transitory computer readable storage medium 400 in accordance with an embodiment of the present invention. The storage medium 400 contains computer-readable instructions stored in a format that can be retrieved, interpreted, and executed by a computer processing device. By way of example, and not by way of limitation, the computer-readable storage medium may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-Ray, HD-DVD, UMD, or other optical storage medium.

The storage medium 400 contains instructions for dynamic adjustment of user-determined three-dimensional scene settings 401. The dynamic adjustment of user-determined three-dimensional scene setting instructions 401 may be configured to implement dynamic adjustment in accordance with the methods described above with respect to FIG. 1. In particular, the dynamic adjustment instructions 401 may include determining three-dimensional characteristics of scene instructions 403 that are used to determine certain characteristics of a given scene relevant to optimization of that scene's three-dimensional view settings. The dynamic adjustment instructions 401 may further include determining scale factors instructions 405 configured to determine one or more scale factors to represent certain optimization adjustments to be made based on a given scene's characteristics.

The dynamic adjustment instructions 401 may also include adjusting user-determined three-dimensional settings instructions 407 configured to apply the one or more scale factors to the user-determined three-dimensional scene settings, such that the result is a 3-D projection of a scene that takes into account both user preference and inherent scene characteristics. What results is a visual representation of a scene according to the user's pre-determined settings that is modified in accordance with certain characteristics associated with the scene, such that each user's perception of a given scene may be uniquely optimized.

The dynamic adjustment instructions 401 may additionally include display scene instructions 409 configured to display a scene on a visual display according to the dynamically adjusted three-dimensional scene settings obtained above.

Figure 6B:
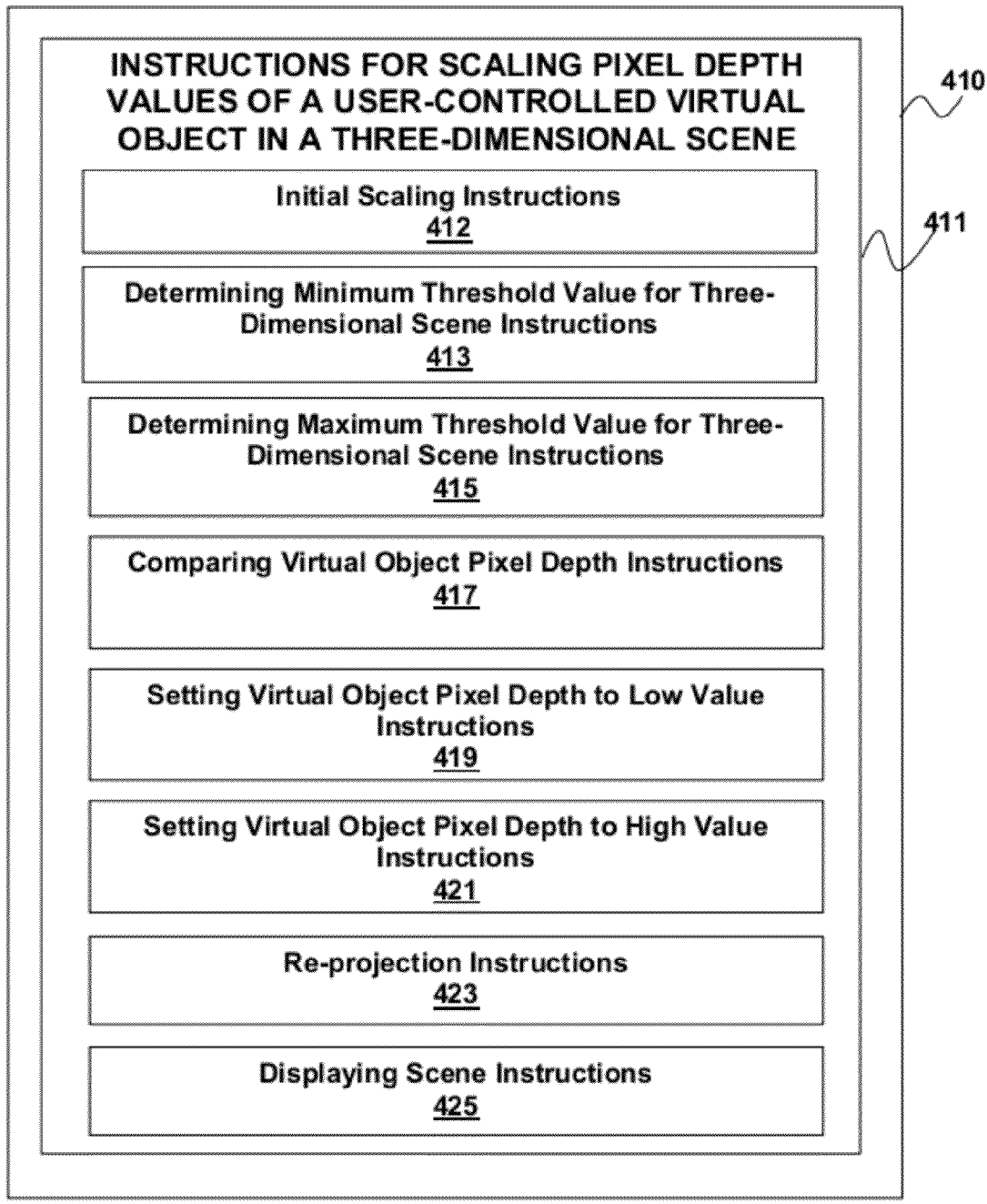
FIG. 6B illustrates an example of a non-transitory computer-readable storage medium with instructions for implementing scaling pixel depth values of a user-controlled virtual object in a three-dimensional scene according to an embodiment of the present invention.

According to another embodiment, instructions for scaling pixel depth values of a user-controlled virtual object in a three-dimensional scene may be stored in a computer readable storage medium. By way of example, and not by way of limitation, FIG. 6B illustrates an example of a non-transitory computer readable storage medium 410 in accordance with an embodiment of the present invention. The storage medium 410 contains computer-readable instructions stored in a format that can be retrieved, interpreted, and executed by a computer processing device. By way of example, and not by way of limitation, the computer-readable storage medium may be a computer-readable memory, such as random access memory (RAM) or read-only memory (ROM), a computer-readable storage disk for a fixed disk drive (e.g., a hard disk drive), or a removable disk drive. In addition, the computer-readable storage medium 410 may be a flash memory device, a computer-readable tape, a CD-ROM, a DVD-ROM, a Blu-Ray, HD-DVD, UMD, or other optical storage medium.

The storage medium 410 contains instructions for scaling pixel depth values of a user-controlled virtual object in a three-dimensional scene 411. The instructions for scaling pixel depth values of a user-controlled virtual object in a three-dimensional scene 411 may be configured to implement pixel depth scaling in accordance with the methods described above with respect to FIG. 3. In particular, the pixel depth scaling instructions 411 may include initial scaling instructions 412 that, when executed, perform an initial scaling of a two-dimensional image of a three-dimensional scene. The instructions 411 may further include determining minimum threshold of three-dimensional scene instructions 413 that are used to determine a minimum threshold value that the pixel depth values of the user-controlled virtual object may not fall below for a particular scene. Similarly, the pixel depth scaling instructions 411 may also include determining maximum threshold of three-dimensional scene instructions 415 that are used to determine a maximum threshold value that the pixel depth values of the user-controlled virtual objects may not exceed for a particular scene.

The pixel depth scaling instructions 411 may also include comparing virtual object pixel depth instructions 417 that are used to compare the pixel depths associated with the user-controlled virtual object to the threshold values determined above. By comparing the pixel-depth values of the user-controlled virtual object to that of the threshold values, one can continuously track the location of the user-controlled virtual object to ensure that it does not penetrate other virtual elements in a three-dimensional scene.

The pixel depth scaling instructions 411 may further include setting virtual object pixel depths to low value instructions 419 that limit any part of a virtual object's depth from falling below the minimum threshold value. The low value assigned to the virtual object's exceedingly low pixel depth values may be the minimum threshold value itself, or a scaled version of the low pixel depth value, as discussed above.

The pixel depth scaling instructions 411 may additionally include setting virtual object pixel depths to high value instructions 421 that limit any part of a virtual object's depth from exceeding the maximum threshold value. The high value assigned to the virtual object's exceedingly high pixel depth values may be the maximum threshold value itself, or a scaled version of the high pixel depth value, as discussed above.

The pixel depth scaling instructions may further include re-projection instructions 423 that perform a re-projection on the two-dimensional image to produce two or more views of the three-dimensional scene using a resulting set of pixel depth values for the user-controlled virtual object. The pixel depth scaling instructions 411 may additionally include display scene instructions 425 configured to display a scene on a visual display using the resulting set of virtual object pixel depth settings.

As noted above, embodiments of the present invention may make use of three-dimensional viewing glasses. An example of three-dimensional viewing glasses 501 in accordance with an aspect of the present invention are shown in FIG. 7. The glasses may include a frame 505 for holding a left LCD eyeglass lens 510 and a right LCD eyeglass lens 512. As noted above, each eyeglass lens 510 and 512 can be rapidly and selectively blackened so as to prevent the wearer from seeing through the lens. Left and right earphones 530 and 532 are also preferably connected to the frame 505. An antenna 520 for sending and receiving wireless information may also be included in or on the frame 505. The glasses may be tracked via any means to determine if the glasses are looking toward the screen. For example, the front of the glasses may also include one or more photo detectors 540 for detecting the orientation of the glasses towards the monitor.

The alternating displays of images from the video feed can be provided using various known techniques. The visual display 111 of FIG. 1 can be configured to operate in a progressive scan mode for each video feed that is shared on the screen. However embodiments of the present invention may also be configured to work with interlaced video, as described. For a standard television monitor, such as those using an interlaced NTSC or PAL format, the images of the two video feeds may be interlaced and the lines of an image from one video feed may be interleaved with the lines of an image from the other video feed. For example, the odd-numbered lines taken from an image from the first video feed are displayed, and then the even-numbered lines taken from an image from the second video feed are displayed.

A system-level diagram of glasses that can be used in conjunction with embodiments of the present invention is shown in FIG. 8. The glasses may include a processor 602 which executes instructions from program 608 stored in a memory 604. Memory 604 may also store data to be provided to, or output from, processor 602 as well as any other storage retrieval/storage element of the glasses. Processor 602, memory 604 and the other elements of the glasses may communicate with one another over a bus 606. Such other elements may include an LCD Driver 610 which provides a driver signal which selectively shutters left and right LCD lens 612 and 614. The LCD Driver may shutter each left and right LCD lens individually and at different times and durations, or together at the same time and duration.

The frequency at which the LCD lenses are shuttered may be stored in advance in the glasses (e.g., based on the known frequencies of NTSC). Alternatively, the frequency may be selected via means of user input 616 (e.g., knobs or buttons to adjust or enter the desired frequency). Yet further, the desired frequency as well as the initial shutter start time, or other information indicating the time period during which the LCD lenses should be shuttered or not regardless of whether such time periods are at a set frequency and duration, may be transmitted to the glasses via wireless transmitter receiver 601 or any other input element. The wireless transmitter/receiver 601 may comprise any wireless transmitter, including a Bluetooth transmitter/receiver.

An audio amplifier 620 may also receive information from the wireless transmitter/receiver 601, namely, the left and right channels of audio to be provided to left speaker 622 or right speaker 624. The glasses may also include a microphone 630. The microphone 630 may be used in connection with games providing for voice communication; the voice signals may be transmitted to a game console or another device via wireless transmitter/receiver 601.

The glasses may also include one or more photo detectors 634. The photo detectors may be used to determine whether the glasses are oriented towards the monitor. For example, the photo detectors may detect the intensity of light hitting the photo detectors and transmit the information to processor 602. If the processor detects a substantial drop in light intensity, which may relate to the user looking away from the monitor, the processor may cease the shuttering of the lenses. Other methods of determining whether the glasses (and thus user) are oriented towards the monitor may also be used. For example, one or more cameras in lieu of photo detectors may be used and the captured images examined by processor 602 to determine whether the glasses are oriented towards the monitor. Just a few possible embodiments of using such a camera may include checking contrast levels to detect whether the camera is pointed at the monitor or attempting to detect brightness test patterns on the monitor. The device providing multiple feeds to the monitor may indicate the presence of such test patterns by transmitting information to processor 602 via wireless transmitter/receiver 601.

It is noted that certain aspects of embodiments of the invention could be implemented by the glasses, e.g., by software or firmware implemented on the processor 602. For example, color contrast or correction settings driven by the content and scaled/adjusted by the user could be implemented in the glasses with an extra metadata stream sent to the glasses. Additionally with improvements in wireless and LCD the processor 113 could broadcast left eye and right eye image data directly to the glasses 119 thereby eliminating the need for a separate display 111. Alternatively the glasses could be fed monoscopic-images and associated pixel depth values from the display 111 or processor 113. Both of these imply that the re-projection process would actually occur on the glasses.

Although examples of implementations have been described in which stereoscopic 3D images are viewed using passive or active 3D viewing glasses, embodiments of the invention are not limited to such implementations. Specifically, embodiments of the invention can be applied to stereoscopic 3D video technologies that do not rely on head tracking or passive or active 3D-viewing glasses. Examples of such "glasses-free" stereoscopic 3D video technologies are sometimes referred to as Autostereoscopic technologies or Autostereoscopy. Examples of such technologies include, but are not limited to, technologies based on the use of lenticular lenses. A lenticular lens is an array of magnifying lenses, designed so that when viewed from slightly different angles, different images are magnified. The different images can be chosen to provide a three-dimensional viewing effect as a lenticular screen is viewed at different angles. The number of images generated increases proportionally to the number of viewpoints for the screen.

More specifically in a lenticular lens video system, re-projection images of a scene from slightly different viewing angles can be generated from an original 2D image and depth information for each pixel in the image. Using re-projection techniques, different views of the scene from progressively different viewing angles can be generated from the original 2D image and depth information. Images representing the different views can be divided into strips and displayed in an interlaced fashion on an autostereoscopic display having a display screen that lies between a lenticular lens array and viewing location. The lenses that make up the lenticular lens can be cylindrical magnifying lenses that are aligned with the strips and generally twice as wide as the strips. A viewer perceives different views of the scene depending on the angle at which the screen is viewed. The different views can be selected to provide the illusion of depth in the scene being displayed.

Although the present invention has been described in considerable detail with reference to certain preferred versions thereof, other versions are possible. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶ 6. In particular, the use of "step of" in the claims herein is not intended to invoke the provisions of 35 USC §112, ¶ 6.

The reader's attention is directed to all papers and documents which are filed concurrently with this specification and which are open to public inspection with this specification, and the contents of any papers and documents incorporated herein by reference.

What is claimed is:

1. A method for dynamic adjustment of a set of predetermined three-dimensional stereo video parameter settings, comprising:
   a) determining one or more three-dimensional depth characteristics of particular scene content in a given scene, selected from a plurality of scenes in which the three-dimensional depth characteristics for different scenes of the plurality varies according to the scene content, wherein determining the one or more three-dimensional depth characteristics of particular scene content in the given scene includes determining a near plane and a far plane of the given scene, wherein the near plane is determined by subtracting a scene pixel depth standard deviation from a scene pixel depth mean, wherein the far plane is determined by adding a scene pixel depth standard deviation to a scene pixel depth mean, and determining a rate at which the three-dimensional characteristics change;
   b) determining one or more scale factors from the one or more three-dimensional depth characteristics of the particular scene content depicted within the given scene;
   c) adjusting the set of predetermined three-dimensional stereo video parameter settings for the given scene by applying the one or more scale factors to the predetermined three-dimensional stereo video parameter settings thereby producing an adjusted set of predetermined three-dimensional stereo video parameters, wherein applying the one or more scale factors includes applying a default scale factor if the rate at which the three-dimensional characteristics change exceeds a threshold; and
   d) displaying the given scene on a three-dimensional stereo display using the adjusted set of predetermined three-dimensional stereo video parameters.

2. The method of claim 1, wherein a) includes determining a near plane and a far plane of the given scene.

3. The method of claim 1, wherein a) further includes determining an average depth value for the given scene.

4. The method of claim 2, wherein the near plane is determined by subtracting a scene pixel depth standard deviation from a scene pixel depth mean.

5. The method of claim 2, wherein the far plane is determined by adding a scene pixel depth standard deviation to a scene pixel depth mean.

6. The method of claim 2, wherein c) includes adjusting a shift amount (for convergence) for each pixel in an image of the scene according to a corresponding one of the one or more scale factors.

7. The method of claim 1, wherein a) includes filtering out one or more unimportant pixels associated with the given scene.

8. The method of claim 1, wherein a) includes weighting each pixel associated with the given scene.

9. The method of claim 1, wherein a) includes determining one or more targets associated with the given scene.

10. The method of claim 1, wherein b) includes determining a rate factor to control a rate at which the predetermined three-dimensional video parameters are adjusted during one or more scene transitions across the different scenes.

11. The method of claim 1, wherein the one or more scale factors in b) are transmitted as metadata associated with the given scene in a stream of the plurality of scenes.

12. The method of claim 1, wherein the set of predetermined three-dimensional video parameter settings includes a boundary of three-dimensional projection.

13. The method of claim 1, wherein a) includes determining a rate at which the three-dimensional characteristics change and wherein c) includes applying a default scale factor if the rate exceeds a threshold.

14. The method of claim 1, wherein the predetermined three-dimensional video parameter settings include stereopsis, convergence, shadow stereopsis, inter-camera spacing, convergence distance, toe-in angle, focal length, or a combination thereof.

15. The method of claim 1, wherein c) includes providing signals for adjusting one or more parameters of a virtual camera used to generate one or more views of the scene.

16. The method of claim 1, wherein c) includes providing signals for adjusting one or more parameters of a physical camera used to generate one or more views of the scene.

17. An apparatus comprising:
a processor;
a memory; and
computer coded instructions embodied in the memory and executable by the processor, wherein the computer coded instructions are configured to implement a method for dynamic adjustment of a set of predetermined three-dimensional stereo video parameter settings, the method comprising:
a) determining one or more three-dimensional depth characteristics of particular scene content in a given scene selected from a plurality of scenes in which the three-dimensional depth characteristics for different scenes of the plurality varies according to the scene content, wherein determining the one or more three-dimensional depth characteristics of particular scene content in the given scene includes determining a near plane and a far plane of the given scene, wherein the near plane is determined by subtracting a scene pixel depth standard deviation from a scene pixel depth mean, wherein the far plane is determined by adding a scene pixel depth standard deviation to a scene pixel depth mean, and determining a rate at which the three-dimensional characteristics change;
b) determining one or more scale factors from the one or more three-dimensional depth characteristics the particular scene content depicted within of the given scene;
c) adjusting the set of predetermined three-dimensional stereo video parameter settings for the given scene by applying the one or more scale factors to the predetermined three-dimensional stereo video parameter settings thereby producing an adjusted set of predetermined three-dimensional stereo video parameters, wherein applying the one or more scale factors includes applying a default scale factor if the rate at which the three-dimensional characteristics change exceeds a threshold; and
d) displaying the given scene on a three-dimensional stereo display using the adjusted set of predetermined three-dimensional stereo video parameters.

18. The apparatus of claim 17, further comprising a three-dimensional visual display configured to display the given scene according to the adjusted set of three-dimensional parameters.

19. The apparatus of claim 17, wherein c) includes providing signals adjusting one or more parameters of a virtual camera used to generate one or more views of the scene.

20. The apparatus of claim 17, wherein c) includes providing signals for adjusting one or more parameters of a physical camera used to generate the one or more views of the scene.

21. A computer program product comprising:
a non-transitory, computer-readable storage medium having computer readable program code embodied in said medium for dynamic adjustment of a set of predetermined three-dimensional stereo video parameter settings, said computer program product having:
a) computer readable program code configured to determine one or more three-dimensional depth characteristics of particular content in a given scene selected from a plurality of scenes in which the three-dimensional depth characteristics for different scenes of the plurality varies across the different scenes according to the scene content, when executed, wherein determining the one or more three-dimensional depth characteristics of particular scene content in the given scene includes determining a near plane and a far plane of the given scene, wherein the near plane is determined by subtracting a scene pixel depth standard deviation from a scene pixel depth mean, wherein the far plane is determined by adding a scene pixel depth standard deviation to a scene pixel depth mean, and determining a rate at which the three-dimensional characteristics change;
b) computer readable program code configured to determine one or more scale factors from the one or more three-dimensional depth characteristics of the particular scene content depicted within the given scene, when executed;
c) computer readable program code configured to adjust the set of predetermined three-dimensional stereo video parameter settings for the given scene by applying the one or more scale factors to the predetermined three-dimensional stereo video parameter settings thereby producing an adjusted set of predetermined three-dimensional stereo video parameters, when executed, wherein applying the one or more scale factors includes applying a default scale factor if the rate at which the three-dimensional characteristics change exceeds a threshold; and
d) computer readable program code means for displaying the given scene on a three- dimensional stereo display using the adjusted set of predetermined three-dimensional stereo video parameters, when executed.

22. The method of claim 1, further comprising:
a) determining a respective set of one or more three-dimensional characteristics of each said scene, the respective set of three-dimensional characteristics of each said scene being dependent on three-dimensional content within the each said scene such that the three-dimensional characteristics are variable across different ones of the scenes;
b) determining a respective set of one or more scale factors for each said scene from each said respective set of one or more three-dimensional characteristics;
c) adjusting the set of predetermined three-dimensional video parameter settings dynamically for each said scene by applying each said respective set of one or more scale factors to the predetermined three-dimensional video parameter settings respectively for each said scene, thereby producing a respective adjusted set of predetermined three-dimensional video parameters for each said scene; and d) displaying the stream of scenes on a three-dimensional display using each said respective adjusted set of predetermined three-dimensional video parameters for each said scene in the stream.

23. The method of claim 1, wherein a) includes determining a near plane and a far plane of the given scene, wherein the near plane is determined by subtracting a scene pixel depth standard deviation from a scene pixel depth mean, wherein the far plane is determined by adding a scene pixel depth standard deviation to a scene pixel depth mean.

24. The method of claim 1, wherein the one or more three dimensional depth characteristics include an average pixel depth of the given scene, a standard deviation of pixel depth of the given scene, a near plane of the given scene, a far plane of the given scene, or a combination thereof.

* * * * *